(12) United States Patent
Wengreen et al.

(10) Patent No.: US 10,286,908 B1
(45) Date of Patent: May 14, 2019

(54) SELF-DRIVING VEHICLE SYSTEMS AND METHODS

(71) Applicants: Eric John Wengreen, Sammamish, WA (US); Wesley Edward Schwie, Minneapolis, MN (US)

(72) Inventors: Eric John Wengreen, Sammamish, WA (US); Wesley Edward Schwie, Minneapolis, MN (US)

( * ) Notice: Subject to any disclaimer, the term of this patent is extended or adjusted under 35 U.S.C. 154(b) by 0 days.

(21) Appl. No.: 16/178,392

(22) Filed: Nov. 1, 2018

(51) Int. Cl.
| | |
|---|---|
| *B60W 30/09* | (2012.01) |
| *G06K 9/00* | (2006.01) |
| *B60W 30/095* | (2012.01) |
| *G05D 1/02* | (2006.01) |
| *G05D 1/00* | (2006.01) |

(52) U.S. Cl.
CPC ..... *B60W 30/0956* (2013.01); *G06K 9/00798* (2013.01); *G06K 9/00805* (2013.01); *G06K 9/00825* (2013.01); *B60W 2420/42* (2013.01); *B60W 2420/52* (2013.01); *B60W 2550/306* (2013.01); *B60W 2550/408* (2013.01); *B60W 2750/40* (2013.01); *G05D 1/0088* (2013.01); *G05D 1/0248* (2013.01); *G05D 1/0257* (2013.01)

(58) Field of Classification Search
CPC ......... B60W 30/0956; B60W 2420/52; B60W 2550/306; G06K 9/00798; G06K 9/00825; G05D 1/0088
USPC .......................................... 701/28, 300, 301
See application file for complete search history.

(56) References Cited

U.S. PATENT DOCUMENTS

| | | |
|---|---|---|
| 4,212,069 A | 7/1980 | Baumann |
| 5,798,695 A | 8/1998 | Metalis |
| 5,945,919 A | 8/1999 | Trask |
| 6,011,478 A | 1/2000 | Suzuki |
| 7,413,357 B2 | 8/2008 | Badalian |
| 7,698,078 B2 | 4/2010 | Kelty |
| 7,777,619 B2 | 8/2010 | Yopp |
| 8,078,359 B2 | 12/2011 | Small |
| 8,180,379 B2 | 5/2012 | Forstall |
| 8,325,025 B2 | 12/2012 | Morgan |
| 8,433,934 B1 | 4/2013 | On |
| 8,634,980 B1 | 1/2014 | Urmson |
| 8,700,251 B1 | 4/2014 | Zhu |
| 8,849,494 B1 | 9/2014 | Herbach |
| 8,874,305 B2 | 10/2014 | Dolgov |
| 8,949,016 B1 | 2/2015 | Ferguson |

(Continued)

OTHER PUBLICATIONS

Google Self-Driving Vehicle—Online prior to Apr. 13, 2016 at www.google.com/selfdrivingcar/.

(Continued)

*Primary Examiner* — Tan Q Nguyen

(57) ABSTRACT

A vehicle guidance system can include a first vehicle that has a camera, radar, and lidar to record a first path of a second vehicle as the first and second vehicles drive on a road. A processor system of the vehicle guidance system can analyze a first deviation of the first path. Information from a third vehicle can provide additional data regarding a second path of the second vehicle. Analyzing the first path in light of the second path can enable the vehicle guidance system to identify impaired driving indicators. The vehicle guidance system can warn other vehicles about the impaired driver.

30 Claims, 8 Drawing Sheets

(56) References Cited

U.S. PATENT DOCUMENTS

| | | | |
|---|---|---|---|
| 8,954,217 B1 | 2/2015 | Montemerlo | |
| 8,954,252 B1 | 2/2015 | Urmson | |
| 8,965,621 B1 | 2/2015 | Urmson | |
| 8,996,224 B1 | 3/2015 | Herbach | |
| 9,008,890 B1 | 4/2015 | Herbach | |
| 9,019,107 B2 | 4/2015 | Biondo | |
| 9,026,300 B2 | 5/2015 | Ferguson | |
| 9,119,038 B2 | 8/2015 | Woods | |
| 9,120,484 B1* | 9/2015 | Ferguson | G06T 7/521 |
| 9,120,485 B1 | 9/2015 | Dolgov | |
| 9,139,133 B2 | 9/2015 | Eng | |
| 9,194,168 B1 | 11/2015 | Lu | |
| 9,262,914 B2 | 2/2016 | Purushothaman | |
| 9,290,174 B1 | 3/2016 | Zagorski | |
| 9,429,947 B1 | 8/2016 | Wengreen | |
| 9,459,622 B2 | 10/2016 | Abhyanker | |
| 9,514,623 B1 | 12/2016 | Urrutia | |
| 9,527,217 B1 | 12/2016 | Lowy | |
| 9,646,356 B1 | 5/2017 | Schwie | |
| 9,685,058 B2 | 6/2017 | Schmidt | |
| 9,915,949 B2 | 3/2018 | Schwie | |
| 10,036,642 B2 | 7/2018 | Ross | |
| 10,050,760 B2 | 8/2018 | Ross | |
| 2002/0121291 A1 | 9/2002 | Daum | |
| 2003/0195696 A1 | 10/2003 | Jones | |
| 2003/0214585 A1* | 11/2003 | Bakewell | G08G 1/054 348/148 |
| 2007/0198144 A1 | 8/2007 | Norris | |
| 2009/0140886 A1 | 6/2009 | Bender | |
| 2009/0287367 A1 | 11/2009 | Salinger | |
| 2011/0098017 A1 | 4/2011 | Berry | |
| 2012/0009845 A1 | 1/2012 | Schmelzer | |
| 2012/0083960 A1 | 4/2012 | Zhu | |
| 2013/0085817 A1 | 4/2013 | Pinkus | |
| 2013/0132140 A1 | 5/2013 | Amin | |
| 2013/0197674 A1 | 8/2013 | Lowry | |
| 2013/0231824 A1 | 9/2013 | Wilson | |
| 2013/0246301 A1 | 9/2013 | Radhakrishnan | |
| 2013/0335213 A1* | 12/2013 | Sherony | G08G 1/167 340/439 |
| 2014/0129951 A1 | 5/2014 | Amin | |
| 2014/0172727 A1 | 6/2014 | Abhyanker | |
| 2014/0316616 A1 | 10/2014 | Kugelmass | |
| 2014/0336935 A1 | 11/2014 | Zhu | |
| 2014/0350855 A1 | 11/2014 | Vishnuvajhala | |
| 2015/0012833 A1 | 1/2015 | Foy | |
| 2015/0046080 A1 | 2/2015 | Wesselius | |
| 2015/0066284 A1 | 3/2015 | Yopp | |
| 2015/0088421 A1 | 3/2015 | Foster | |
| 2015/0120503 A1 | 4/2015 | Todasco | |
| 2015/0148077 A1 | 5/2015 | Jelle | |
| 2015/0149283 A1 | 5/2015 | Horstemeyer | |
| 2015/0185034 A1 | 7/2015 | Abhyanker | |
| 2015/0199619 A1 | 7/2015 | Ichinose | |
| 2015/0248689 A1 | 9/2015 | Paul | |
| 2015/0271290 A1 | 9/2015 | Tao | |
| 2015/0295949 A1 | 10/2015 | Chizeck | |
| 2015/0339928 A1 | 11/2015 | Ramanujam | |
| 2015/0346727 A1 | 12/2015 | Ramanujam | |
| 2015/0348221 A1 | 12/2015 | Pedersen | |
| 2016/0027307 A1 | 1/2016 | Abhyanker | |
| 2016/0034828 A1 | 2/2016 | Sarawgi | |
| 2016/0034845 A1 | 2/2016 | Hiyama | |
| 2016/0071056 A1 | 3/2016 | Ellison | |
| 2016/0092976 A1 | 3/2016 | Marusyk | |
| 2016/0116293 A1 | 4/2016 | Grover | |
| 2016/0125735 A1 | 5/2016 | Tuukkanen | |
| 2016/0187150 A1 | 6/2016 | Sherman | |
| 2016/0209220 A1 | 7/2016 | Laetz | |
| 2016/0209843 A1 | 7/2016 | Meuleau | |
| 2016/0227193 A1 | 8/2016 | Osterwood | |
| 2016/0247095 A1 | 8/2016 | Scicluna | |
| 2016/0247106 A1 | 8/2016 | Dalloro | |
| 2016/0264021 A1 | 9/2016 | Gillett | |
| 2016/0277560 A1 | 9/2016 | Gruberman | |
| 2016/0301698 A1 | 10/2016 | Katara | |
| 2016/0342934 A1 | 11/2016 | Michalik | |
| 2016/0364812 A1 | 12/2016 | Cao | |
| 2016/0370194 A1 | 12/2016 | Colijn | |
| 2017/0024393 A1 | 1/2017 | Choksi | |
| 2017/0050321 A1 | 2/2017 | Look | |
| 2017/0068245 A1 | 3/2017 | Scofield | |
| 2017/0075358 A1 | 3/2017 | Zhang | |
| 2017/0089715 A1 | 3/2017 | Guo | |
| 2017/0103490 A1 | 4/2017 | Haparnas | |
| 2017/0132540 A1 | 5/2017 | Haparnas | |
| 2017/0147951 A1 | 5/2017 | Meyer | |
| 2017/0147959 A1 | 5/2017 | Sweeney | |
| 2017/0248949 A1 | 8/2017 | Moran | |
| 2017/0300053 A1 | 10/2017 | Wengreen | |
| 2017/0301220 A1* | 10/2017 | Jarrell | H04W 4/70 |
| 2017/0316621 A1 | 11/2017 | Jefferies | |
| 2017/0363430 A1 | 12/2017 | Al-Dahle | |
| 2018/0130161 A1 | 5/2018 | Wengreen | |
| 2019/0035277 A1* | 1/2019 | Son | G08G 1/163 |

OTHER PUBLICATIONS

Tesla Autopilot—Online prior to Apr. 13, 2016 at www.technologyreview.com/s/600772/10-breakthrough-technologies-2016-tesla-autopilot/.

Tesla Model S Software Version 7—Autopilot—Online prior to Apr. 13, 2016 at www.teslamotors.com/presskit/autopilot.

BMW Heads Up Display—Online prior to Apr. 13, 2016 at www.autotrader.com/car-news/full-color-heads-up-display-to-debut-on-new-3-series-132586.

Uber Details—Online prior to Apr. 13, 2016 at www.wikihow.com/Use-Uber.

Raspberry Pi: How can I detect the direction of a sound—Online prior to Apr. 13, 2016 at www.quora.com/Raspberry-Pi-1/How-can-I-detect-the-direction-of-a-sound.

Wikipedia: Biometric Device—Downloaded on Aug. 19, 2016 from en.wikipedia.org/wiki/Biometric_device.

Self-Driving Cars Go Public; Uber Offers Rides in Pittsburgh—Downloaded on Aug. 19, 2016 from www.yahoo.com/news/uber-autonomous-cars-haul-people-125127470.html?ref=gs.

Mark Harris, Uber Could Be First to Test Completely Driverless Cars in Public, Sep. 14, 2015, IEEE Spectrum, http://spectrum.ieee.org/cars-that-think/transportation/self-driving/uber-could-be-first-to-test-completely-driverless-cars-in-public.

Zach Epstein, You'll be riding in self-driving cars as soon as next year, May 6, 2016, BGR.com, http://bgr.com/2016105'06/lyfl-self-driving-cars-2017/, pp. 1-5.

Ramsey et al., GM, Lyft to Test Self-Driving Electric Taxis, May 5, 2016, The Wall Street Journal, http://www.wsj.com/articles/gm-lyft-to-test-self-driving-electric-taxis-1462460094, pp. 1-4.

Explain That Stuff: Smoke Detectors—Downloaded on Sep. 28, 2018 from www.explainthatstuff.com/smokedetector.html.

Nittan: EV-DP Smoke Detector—Downloaded on Sep. 28, 2018 from nittan.co.uk/products/products/ev/ev-dp.

Wikipedia: Rain Sensor—Downloaded on Sep. 28, 2018 from en.wikipedia.org/wiki/Rain_sensor.

Nest: Split-Spectrum White Paper—Downloaded on Oct. 1, 2018 from nest.com/support/images/misc-assets/Split-Spectrum-Sensor-White-Paper.pdf.

How Police Visually Detect Drunk Drivers—Downloaded on Oct. 19, 2018 from thelaw.com/law/how-police-visually-detect-drunk-drivers.185.

Velodyne VLS-128 LiDAR Sensor—Downloaded on Oct. 22, 2018 from velodynelidar.com/vls-128.html.

Waymo's Suite of Custom-Built, Self-Driving Hardware—Downloaded on Oct. 22, 2018 from medium.com/waymo/introducing-waymos-suite-of-custom-built-self-driving-hardware-c47d1714563.

Lidar—Downloaded on Oct. 24, 2018 from en.wikipedia.org/wiki/Lidar.

(56) References Cited

OTHER PUBLICATIONS

Radar—Downloaded on Oct. 24, 2018 from en.wikipedia.org/wiki/Radar.

* cited by examiner

SELF-DRIVING VEHICLE SYSTEMS AND METHODS

BACKGROUND

Field

Various embodiments disclosed herein relate to vehicles. Certain embodiments relate to self-driving vehicles.

Description of Related Art

According to the National Highway Traffic Safety Administration, 37,133 people were killed in vehicle crashes in 2017 in the United States. Although determining precise impaired-driving statistics is difficult, some studies have estimated that impaired driving could be the cause of approximately half of all vehicle crashes. Causes of impaired driving can include alcohol, illegal drugs, legal drugs, drowsiness, and distractions (such as texting or watching a screen while driving). Impaired driving is extremely dangerous to people in the vehicle with the impaired driver and to people in other vehicles.

Detecting impaired driving has previously proven to be nearly impossible in all but the most egregious cases. Many impaired drivers are not caught until they are identified at the scene of an accident. The most effective method currently employed to catch drunk or drugged drivers is a sobriety checkpoint where police officers stop each vehicle and talk to each driver. Sobriety checkpoints are highly intrusive, illegal in some states, and do not substantially reduce impaired driving because they are so rare. Some apps enable impaired drivers to avoid sobriety checkpoints by notifying drivers where police are conducting enforcement operations. As a result, there is a need for systems and methods that better detect impaired driving. Better detecting impaired driving will save thousands of lives each year.

SUMMARY

The ability of self-driving vehicles to save lives is so impressive that society has a moral imperative to develop self-driving technology such that it can be widely adopted. Self-driving vehicles will save tens of thousands of lives per year. The majority of vehicle-related deaths are caused by driver error. Tests have shown that self-driving vehicles nearly eliminate self-inflicted accidents (although they are not immune to accidents caused by human drivers of other vehicles). Self-driving vehicles can have unlimited attention spans and can process complex sensor data nearly instantaneously.

Impaired driving is extremely dangerous to people in the vehicle with the impaired driver and to people in other vehicles. According to some studies, impaired driving could be the cause of approximately half of all vehicle crashes. Causes of impaired driving can include alcohol, illegal drugs, legal drugs, drowsiness, and distractions (such as texting or watching a screen while driving).

In some embodiments, a vehicle guidance system comprises a first vehicle comprising a first lane position detection system having at least one of a first camera, a first radar and a first lidar. The first lane position detection system can be configured to record a first path of a second vehicle as the first vehicle and the second vehicle travel on a first road. The vehicle guidance system can comprise a processor system configured to analyze a first deviation of the first path of the second vehicle relative to a first lane of the first road. The vehicle guidance system can be configured to receive (from the first vehicle) a first indicator of the second vehicle driving impaired. The vehicle guidance system can be configured to receive (from a third vehicle) a second indicator of the second vehicle driving impaired.

In some embodiments, a vehicle guidance system is configured to receive a first impaired driving indicator. A vehicle guidance system can comprise a first vehicle comprising a first lane position detection system having at least one of a first camera, a first radar and a first lidar. The first lane position detection system can be configured to record a first path of a second vehicle as the first vehicle and the second vehicle travel on a first road. A vehicle guidance system can comprise a processor system configured to analyze a first deviation of the first path of the second vehicle relative to a first lane of the first road.

In some embodiments, a vehicle guidance system comprises a third vehicle comprising a second lane position detection system having at least one of a second camera, a second radar and a second lidar. The second lane position detection system can be configured to record a second path of the second vehicle as the third vehicle and the second vehicle travel on a second road. The processor system can be configured to analyze a second deviation of the second path of the second vehicle relative to a second lane of the second road.

In some embodiments, a vehicle guidance system comprises a communication system configured to send a first communication to a fourth vehicle in response to the first deviation being greater than a first predetermined threshold and the second deviation being greater than a second predetermined threshold. The first communication can be configured to prompt the fourth vehicle to alter a first driving route of the fourth vehicle to keep away from the second vehicle.

In some embodiments, a vehicle guidance system comprises a communication system configured to send a first communication to a law enforcement (e.g., by reporting the impaired vehicle by calling "911") in response to the first deviation being greater than a first predetermined threshold and/or in response to the second deviation being greater than a second predetermined threshold. The first communication can be configured to prompt a law enforcement officer to apprehend the second vehicle. The first communication can comprise a description of the second vehicle and/or a location indicator of the second vehicle (e.g., "the second vehicle is heading west on Main Street").

In some embodiments, the first lane position detection system is configured to compensate for motion of the first vehicle to determine a speed of the second vehicle. The first lane position detection system can be configured to compensate for the motion of the first vehicle to determine movements of the second vehicle toward at least one of a left side of the first lane and a right side of the first lane. The processor system can be configured to analyze the first deviation based on the speed and the movements.

In some embodiments, the first lane position detection system comprises the first camera. The first camera of the first vehicle can be configured to record lane markers of the first lane. The first camera can be configured to record the first path of the second vehicle to enable the processor system to analyze the first deviation by comparing the first path relative to positions of the lane markers.

In some embodiments, the first lane position detection system comprises the first camera and at least one of the first lidar and the first radar. The first camera can be configured to identify lane markers of the first lane.

In some embodiments, the first lidar is configured to identify the first path of the second vehicle to enable the processor system to analyze the first deviation by comparing the first path relative to positions of the lane markers.

In some embodiments, the first radar is configured to identify the first path of the second vehicle to enable the processor system to analyze the first deviation by comparing the first path relative to positions of the lane markers.

In some embodiments, a vehicle guidance system comprises a communication system configured to send a first communication to a fourth vehicle in response to the first deviation being greater than a predetermined threshold. The first communication can be configured to prompt the fourth vehicle to alter a first driving route of the fourth vehicle to keep away from the second vehicle. The first communication can be configured to prompt the fourth vehicle to move away from the second vehicle.

In some embodiments, the first camera of the first vehicle is configured to take an image (e.g., a still picture or a video) of the second vehicle. The vehicle guidance system can comprise an image analysis system configured to identify at least one characteristic of the second vehicle by analyzing the image taken by the first vehicle.

In some embodiments, the communication system is configured to send a second communication having the at least one characteristic to the fourth vehicle to enable the fourth vehicle to keep away from the second vehicle in response to receiving the first communication and in response to identifying the second vehicle based on the at least one characteristic of the second communication.

In some embodiments, the least one characteristic comprises at least one of a color of the second vehicle, a shape of the second vehicle, a license plate identification of the second vehicle, a make of the second vehicle, and a model of the second vehicle.

In some embodiments, the vehicle guidance system comprises a database having vehicle characteristic data. The vehicle guidance system can be configured to compare the at least one characteristic of the second vehicle to the database to determine physical identification information of the second vehicle that is more precise than the at least one characteristic.

In some embodiments, the first lane position detection system comprises at least one of the first lidar and the first radar. At least one of the first lidar and the first radar can be configured to detect an indication of a shape of the second vehicle.

In some embodiments, the vehicle guidance system comprises a database having vehicle shape data. The vehicle guidance system can be configured to compare the indication of the shape to the vehicle shape data to determine physical identification information of the second vehicle, In some embodiments, a communication system is configured to send a second communication comprising the physical identification information to the fourth vehicle to enable the fourth vehicle to keep away from the second vehicle in response to receiving the first communication and in response to identifying the second vehicle based on the physical identification information.

In some embodiments, the vehicle guidance system comprises a location tracking system configured to receive a first location indicator of the second vehicle. The location tracking system can be configured to receive a second location indicator of the fourth vehicle.

In some embodiments, the communication system can be configured to send the first communication to the fourth vehicle in response to the location tracking system determining, based on the first location indicator and the second location indicator, that the fourth vehicle is within a first predetermined distance of the second vehicle.

In some embodiments, the vehicle guidance system comprises a location tracking system configured to monitor a second driving route of the second vehicle and configured to monitor the first driving route of the fourth vehicle.

In some embodiments, the communication system is configured to send the first communication to the fourth vehicle in response to the location tracking system predicting, based on the first driving route and the second driving route, that the fourth vehicle would come within a predetermined distance of the second vehicle.

In some embodiments, the first lane position detection system is configured to compensate for motion of the first vehicle to determine a speed of the second vehicle and to determine movements of the second vehicle toward at least one of a left side of the first lane and a right side of the first lane. The processor system can be configured to analyze the movements compared to the speed to determine that the first path relative to the first lane fluctuates more than a speed-relative threshold.

In some embodiments, the vehicle guidance system further comprises a communication system configured to send a first communication to a fourth vehicle in response to the first path fluctuating more than the speed-relative threshold. The first communication can be configured to prompt the fourth vehicle to alter a first driving route of the fourth vehicle to keep away from the second vehicle.

Some embodiments comprise methods of using a vehicle guidance system. Some embodiments comprise receiving from a first vehicle, by the vehicle guidance system, a first indicator of a second vehicle driving impaired; and/or receiving from a third vehicle, by the vehicle guidance system, a second indicator of the second vehicle driving impaired.

Some embodiments comprise sending, from the vehicle guidance system to a fourth vehicle, a first communication configured to prompt the fourth vehicle to alter a first driving route of the fourth vehicle to keep away from the second vehicle in response to determining, by the vehicle guidance system, that the first indicator and the second indicator are indicative of impaired driving.

In some embodiments, determining that the first indicator is indicative of impaired driving comprises: recording, by the first vehicle, a first path of the second vehicle relative to lane markers as the first vehicle and the second vehicle travel on a first road; compensating for motion of the first vehicle to determine a speed of the second vehicle; compensating for the motion of the first vehicle to determine movements of the second vehicle toward at least one of a left side of the first road and a right side of the first road; and/or analyzing the movements compared to the speed to determine that the first path relative to the lane markers fluctuates more than a speed-relative threshold.

In some embodiments, the first indicator comprises lane control data based on the first vehicle recording a first path of the second vehicle relative to lane markers as the first vehicle and the second vehicle travel on a first road. Some embodiments comprise analyzing, by at least one of the vehicle guidance system and the first vehicle, the first path relative to the lane markers.

In some embodiments, the second indicator comprises lane exit data based on the third vehicle recording the second vehicle exiting a lane of a second road. and then reentering a lane of a second road. The second indicator can comprise lane exit data based on the third vehicle recording the second vehicle exiting a lane of a second road and then reentering the lane of the second road.

In some embodiments, the second indicator comprises detecting, by the third vehicle, that the second vehicle is traveling on a second road at least one of at least five miles per hour slower or at least five miles per hour faster than a speed limit of the second road.

In some embodiments, the second indicator comprises detecting, by the third vehicle, that the second vehicle is traveling at night without illuminated headlights.

In some embodiments, the first indicator comprises lane control data based on the first vehicle recording a position of the second vehicle as the second vehicle travels in a lane of a first road. Embodiments can comprise analyzing, by at least one of the vehicle guidance system and the first vehicle, a deviation of a first path of the second vehicle along the lane relative to lane markers of the first road.

In some embodiments, the first indicator comprises lane control data based on the first vehicle recording a position of the second vehicle as the second vehicle travels in a lane of a first road. Embodiments can comprise analyzing, by at least one of the vehicle guidance system and the first vehicle, a deviation of a first path of the second vehicle along the lane relative to a typical path along the lane.

Embodiments can comprise formulating, by the vehicle guidance system, the typical path along the lane by aggregating lane position data of automobiles as the automobiles travel along the lane.

In some embodiments, the first indicator comprises speed data based on the first vehicle recording a speed of the second vehicle. Embodiments can comprise determining, by at least one of the vehicle guidance system and the first vehicle, that the speed is at least one of at least eight miles per hour faster and at least eight miles slower than a speed limit of a location of the second vehicle.

In some embodiments, the first indicator comprises acceleration data based on the first vehicle recording an acceleration of the second vehicle. Embodiments can comprise analyzing, by at least one of the vehicle guidance system and the first vehicle, changes in the acceleration to enable the vehicle guidance system to determine that the first indicator is indicative of the impaired driving.

In some embodiments, the first indicator comprises a first lane control data based on the first vehicle recording a first path of the second vehicle as the second vehicle travels in a first lane of a first area. Embodiments can comprise analyzing, by at least one of the vehicle guidance system and the first vehicle, a first deviation of the first path relative to the first lane. The second indicator can comprise a second lane control data based on the third vehicle recording a second path of the second vehicle as the second vehicle travels in a second lane of a second area. Embodiments can comprise analyzing, by at least one of the vehicle guidance system and the third vehicle, a second deviation of the second path relative to the second lane.

Some embodiments comprise, in response to analyzing the first deviation and the second deviation, sending, from the vehicle guidance system to a fourth vehicle, a first communication configured to prompt the fourth vehicle to keep away from the second vehicle.

Some embodiments comprise sending, from the vehicle guidance system to the fourth vehicle, the first communication in response to considering (e.g., by at least one of the vehicle guidance system, the first vehicle, and the third vehicle) a combined evidence of both the first deviation and the second deviation.

Some embodiments comprise receiving, by the vehicle guidance system, from the first vehicle a first location indicator of the second vehicle; determining, by the vehicle guidance system based on the first location indicator, that a fourth vehicle is within a first predetermined distance of the second vehicle; and in response, sending, from the vehicle guidance system to the fourth vehicle, a first communication configured to prompt the fourth vehicle to alter a first driving route of the fourth vehicle to keep away from the second vehicle.

Some embodiments comprise receiving, by the vehicle guidance system, from the first vehicle a first location indicator of the second vehicle; receiving, by the vehicle guidance system, a second location indicator of a fourth vehicle; determining, by the vehicle guidance system based on the first location indicator and the second location indicator, that the fourth vehicle is on a first driving route that would come within a predetermined distance of the second vehicle; and in response sending, from the vehicle guidance system to the fourth vehicle, a first communication configured to prompt the fourth vehicle to alter the first driving route of the fourth vehicle to keep away from the second vehicle.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
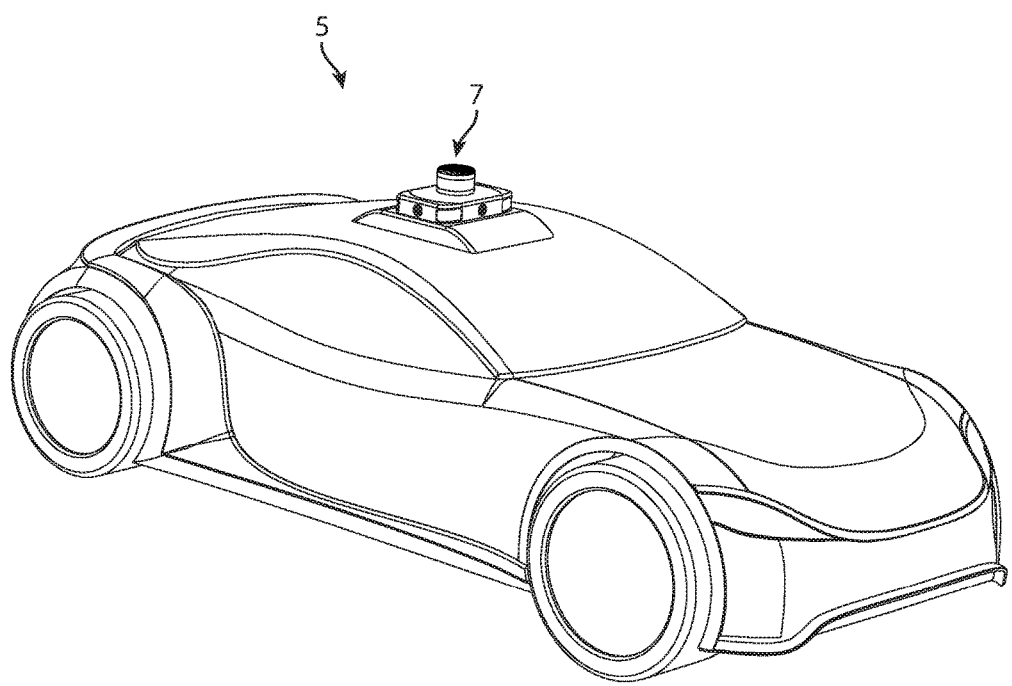
FIG. 1 illustrates a perspective view of a self-driving vehicle, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Self-driving vehicles will save tens of thousands of lives per year. The majority of vehicle-related deaths are caused by driver errors. Tests have shown that self-driving vehicles nearly eliminate self-inflicted accidents (although they are not immune to accidents caused by human drivers of other vehicles).

Self-driving vehicles typically have unlimited attention spans and can process complex sensor data nearly instantaneously. (Alphabet Inc. and Tesla Motors Inc. have built self-driving vehicles.) The ability of self-driving vehicles to save lives is so impressive that society has a moral imperative to develop self-driving technology such that it can be widely adopted.

Although self-driving vehicles will unlock many safety benefits, there are several barriers to rapid adoption of self-driving vehicles. Some of the embodiments described herein overcome several of these barriers.

Self-driving cars are sometimes referred to as autonomous cars, autonomous vehicles, driverless cars, and driverless vehicles. Various levels of "self-driving" behaviors are available to sense surrounding environments and navigate appropriately (e.g., without hitting objects, in a time-efficient manner). Levels of self-driving vehicles comprise Level 1 (Driver Assistance), Level 2 (Partial Automation), Level 3 (Conditional Automation), Level 4 (High Automation), and Level 5 (Full Automation). Of course, other levels and distinctions are possible. The National Highway Traffic Safety Administration has outlined various levels of self-driving vehicle automation based on information from the Society of Automotive Engineers.

Some embodiments can be used with self-driving vehicles. The embodiments, however, are not limited to self-driving vehicles and can be used with non-self-driving vehicles.

As used herein, "location" is used broadly and is not limited to a street address. A location can be a Global Positioning System ("GPS") location and can be any other location indicator. A location can be an outdoor location. A location can be an indoor location (e.g., a location inside a large shopping center or apartment complex).

Some embodiments use iBeacon hardware to enable tracking remote computing devices indoors. iBeacon is a protocol developed by Apple Inc. Several embodiments use radio transceivers (such as Bluetooth transceivers) to enable tracking remote computing devices indoors.

Some embodiments use Global Positioning System ("GPS") hardware to determine an outdoor location of a remote computing device.

In some embodiments, each system comprises at least one processor and a memory comprising program instructions that when executed by the at least one processor cause the system to perform method steps.

FIG. 1 illustrates a perspective view of a self-driving vehicle 5. The self-driving vehicle 5 can include a detection system 7 configured to detect objects (e.g., cars, pedestrians, other vehicles, buildings, fire hydrants, trees, lane markers, guard rails, roadway barriers, sidewalks, roadway signs, traffic lights) located around the self-driving vehicle 5. Various sensors of the detection system 7 can sense objects even closer than an inch away (e.g., by using ultrasonic sensors) and even farther away than 100 yards (e.g., using long-range radar).

Figure 2:
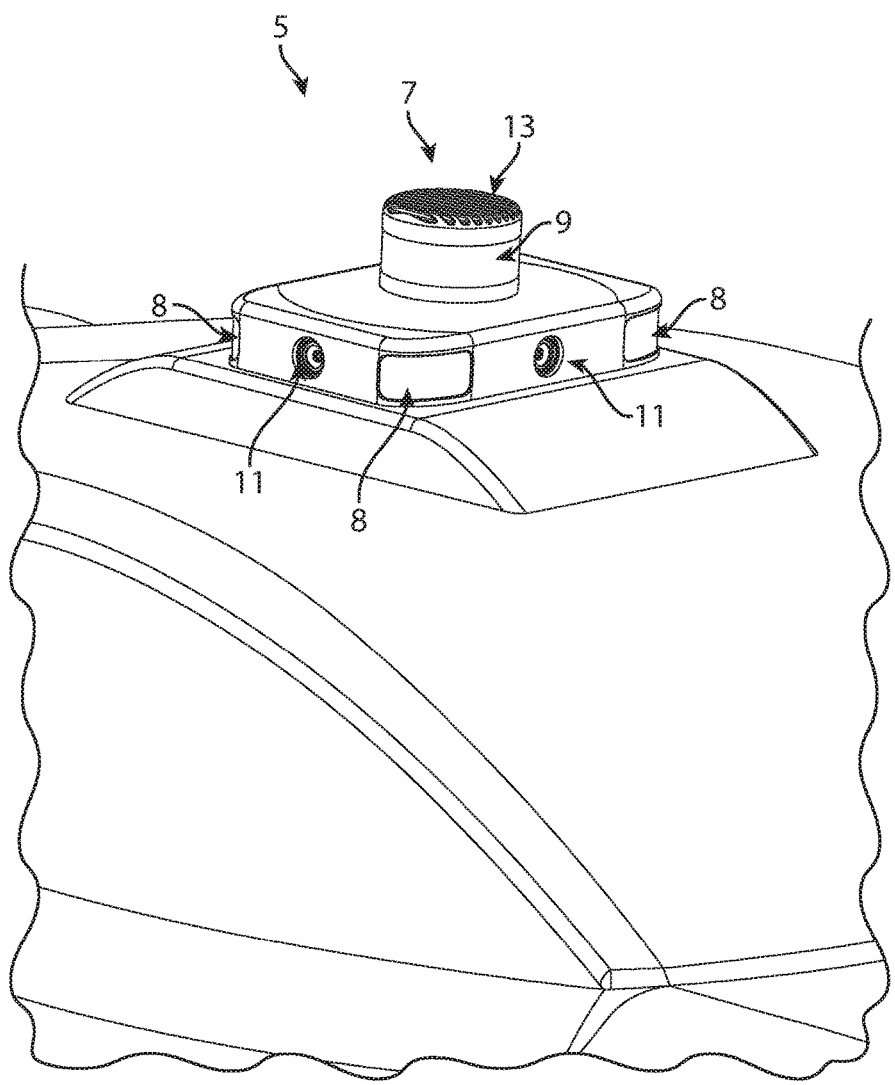
FIG. 2 illustrates a perspective view of a top side, a front side and a passenger side of a detection system, according to some embodiments.
Figure 3:
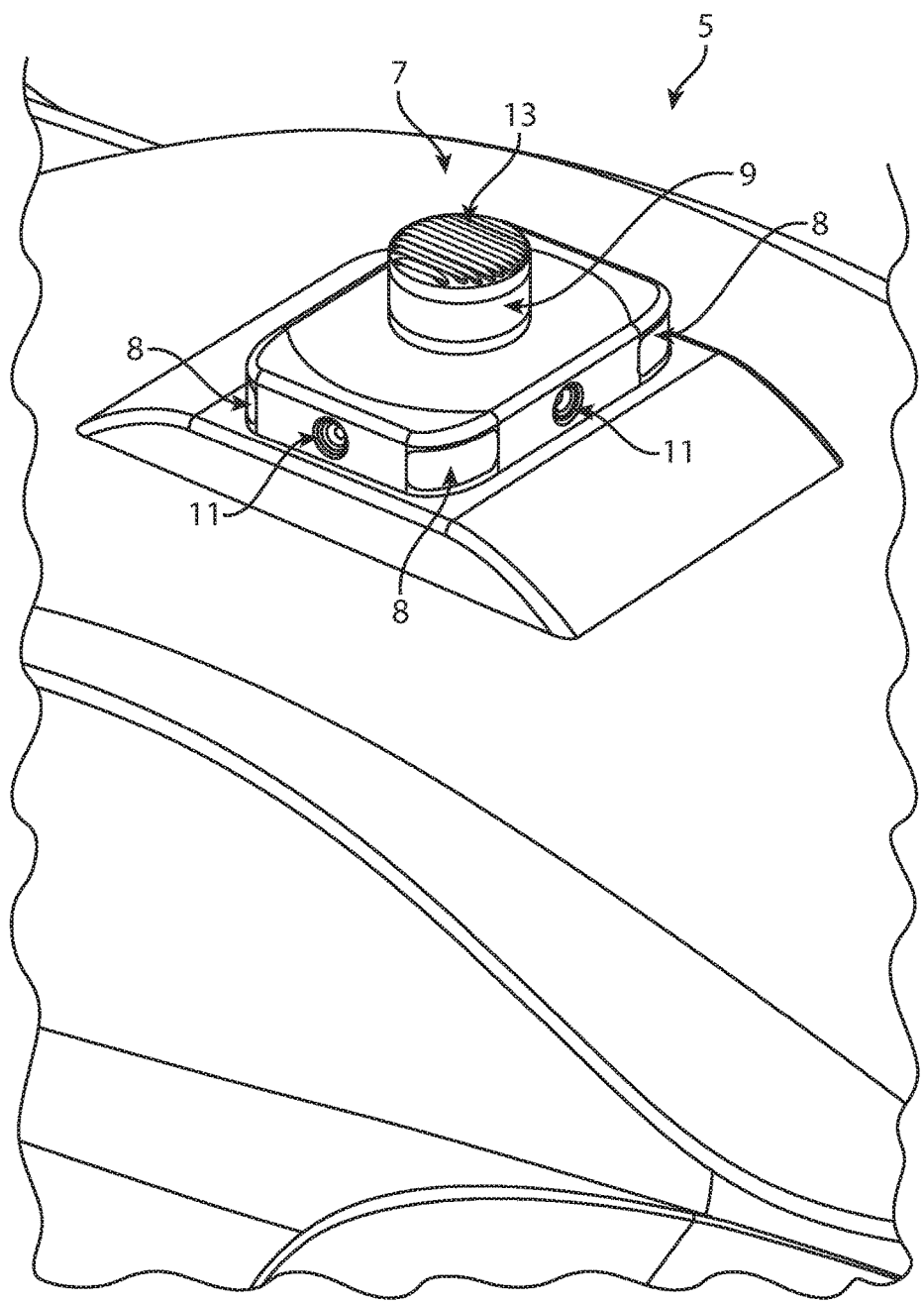
FIG. 3 illustrates a perspective view of the top side, a backside side and a driver side of the detection system, according to some embodiments.
Figure 4:
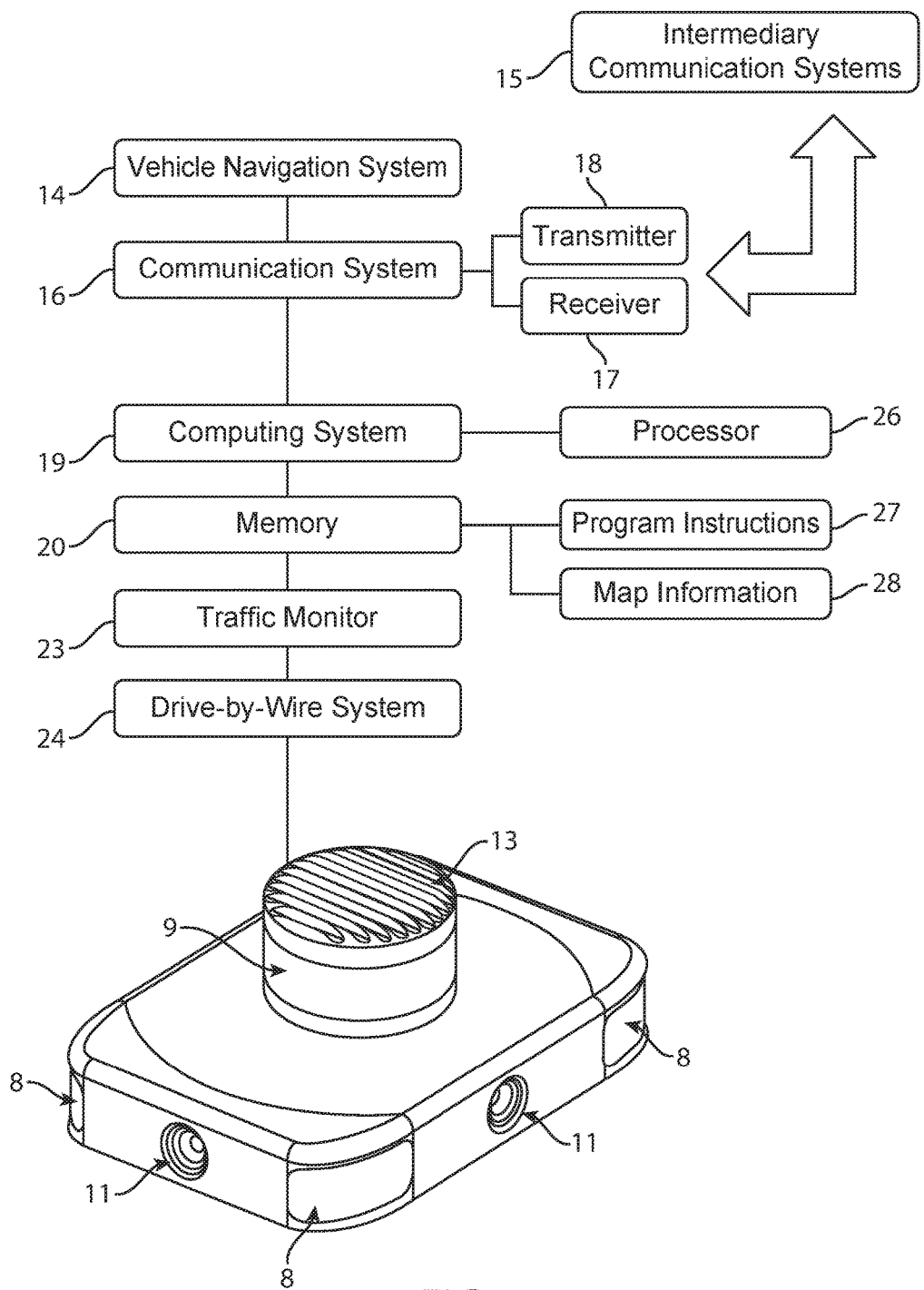
FIG. 4 illustrates a diagrammatic view of portions of a self-driving vehicle, according to some embodiments.

FIG. 2 illustrates a perspective view of the top side, the front side and the passenger side of the detection system 7. FIG. 3 illustrates a perspective view of the top side, the backside side and the driver side of the detection system 7. FIG. 4 illustrates a diagrammatic view of portions of a self-driving vehicle 5, according to some embodiments.

The detection system 7 can comprise radar 8, lidar 9, ultrasonic sensors, cameras 11, and any other sensing devices configured to enable the vehicle 5 to detect objects.

The self-driving vehicle 5 illustrated in FIGS. 1-4 includes a detection system 7 mounted to the roof of the self-driving vehicle 5. In some embodiments, however, the components of the detection system 7 are mounted on different areas of the self-driving vehicle 5. For example, the ultrasonic sensors can be mounted on the bumpers of the self-driving vehicle 5. The short range of the ultrasonic sensors can make bumper mounting helpful (because the bumper is often closer to the objects being sensed). The cameras 11 can be mounted just behind the windshield (e.g., in the rearview mirror) and just behind other windows. The radars 8 can be mounted near each of the four corners of the self-driving vehicle 5. In the illustrated embodiment, however, the detection system 7 can be contained in one assembly to simplify the integration of the detection system 7 into a vehicle.

The detection system 7 can use cameras 11 mounted around a perimeter (e.g., around a perimeter of the vehicle 5 or around a perimeter of a housing of the detection system 7). As illustrated in FIGS. 1-4, the cameras 11 face forward, backward, left, and right to provide (collectively) a 360 degree view around the vehicle 5. The cameras 11 can be high-resolution cameras covered by a glass window to protect each cameras 11 from water and dirt.

Cameras 11 can be configured to see lane markers on a road. Using cameras 11 to see painted lane markers can be helpful (because painted lane markers sometime lack enough three dimensional nature to be detected by some other sensors). In addition, cameras 11 can see color differences (e.g., the difference between the color of the asphalt and the color of yellow or white paint of a lane marker). Cameras 11 can see the color of traffic lights (e.g., red, yellow, green).

Cameras 11 sometimes have trouble seeing in situations where the human eye would have trouble seeing (e.g., in fog or rain).

Radars 8 can be very helpful in fog and rain. An object that is not detected by cameras 11 (e.g., due to fog or rain) can be detected by radar 8. Radars 8 can detect the speed of other vehicles and the distance to other vehicles. Radars 8 can also detect objects that are far away.

Radar is an object-detection system that uses radio waves to determine the range, angle, or velocity of objects. A radar can comprise a transmitter producing electromagnetic waves in the radio or microwave domain, a transmitting antenna, a receiving antenna (which can be the same antenna as the transmitting antenna), a receiver, and/or a processor to determine properties of the objects detected by the radar.

Lidar uses light to detect objects. A lidar 9 can be located on the top portion of the detection system 7 to provide a 360 degree view of the area around the self-driving vehicle 5. The lidar 9 can tell the difference between an actual person and a billboard that includes a picture of a person (due to the three dimensional nature of the actual person and the two dimensional nature of the picture of a person).

The lidar 9 can accurately sense the three dimensional nature of the world around the self-driving vehicle 5. The lidar 9 can also measure the distance to objects. Measuring distance can enable the self-driving vehicle 5 to know, for example, if an approaching car is 5 meters away (so there is not enough time to turn in front of the car) or 25 meters away (so there may be enough time to turn in front of the car).

In some embodiments, the lidar 9 is a Velodyne VLS-128 made by Velodyne LiDAR, Inc. having an office in San Jose, Calif. The Velodyne VLS-128 can provide real-time, three-dimensional data with up to 0.1 degree vertical and horizontal resolution, a range of up to 300 meters, and 360 degree surround view. The VLS-128 can provide the range, resolution and accuracy required by some of the most advanced autonomous vehicle programs in the world.

Many types of lidars can be used. Some embodiments use "incoherent" or direct energy detection (which principally measures amplitude changes of the reflected light). Some embodiments use coherent detection (which in some cases can be well suited for measuring Doppler shifts, or changes in phase of the reflected light). Coherent systems can use optical heterodyne detection.

Lidar can use pulse models. Some lidar embodiments use micropulse or high energy. Micropulse systems can use intermittent bursts of energy. Some lidar embodiments use high-power systems.

Lidar can comprise lasers. Some embodiments include solid-state lasers. Some embodiments include flash lidar. Some embodiments include electromechanical lidar. Some embodiments include phased arrays to illuminate any direction by using a microscopic array of individual antennas. Some embodiments include mirrors (e.g., micro electromechanical mirrors). Some embodiments include dual oscillating plane mirrors, a polygon mirror and/or a scanner (e.g., a dual-axis scanner).

Lidar embodiments can include photodetector and receiver electronics. Any suitable type of photodetector can be used. Some embodiments include solid-state photodetectors (e.g., silicon avalanche photodiodes) and/or photomultipliers.

The motion of the vehicle 5 can be compensated for to accurately determine the location, speed, and direction of objects (such as other vehicles) located outside the vehicle 5. For example, if a first vehicle 5a is heading west at 35 miles per hour and a second vehicle 48 is heading east at an unknown speed, a detection system 7a of the first vehicle 5a can remove the contribution of the 35 miles per hour when determining the speed of the second vehicle 48.

In some embodiments, motion of the vehicle 5 is compensated for by using position and navigation systems to determine the absolute position, speed, and orientation of the lidar, camera, radar, or other object sensing system. A Global Positioning System ("GPS") receiver and/or an Inertial Measurement Unit ("IMU") can be used to determine the absolute position and orientation of the object sensing system.

In some embodiments, a lane position detection system (e.g., 7a) is configured to compensate for motion of the first vehicle 5a to determine a speed of a second vehicle 48. The first lane position detection system can be configured to compensate for the motion of the first vehicle 5a to determine movements of the second vehicle 48 toward a left side of a first lane or toward a right side of the first lane. The processor system (e.g., 26 and/or 35) can be configured to analyze the first deviation based on the speed and the movements.

Lidar can use active sensors that supply their own illumination source. The energy can hit objects. The reflected energy can be detected and measured by sensors. Distance to the object can be determined by recording the time between transmitted and backscattered pulses and by using the speed of light to calculate the distance traveled. Scanning can be used to create a three dimensional image or map of the area around the vehicle 5.

Embodiments can use a short-range lidar to give the self-driving vehicle 5 a surround view near the self-driving vehicle 5 (to see objects close to the self-driving vehicle 5) and can use a long-range lidar configured to not only detect objects located far from the self-driving vehicle 5, but also to enable zooming into objects that are over 200 meters away. The long-range lidar can be very helpful at high-speed highway situations.

Lidar uses light to detect a distance to an object, a direction to the object, and/or a location of an object. Lidar can use pulsed laser light emitted by a laser.

The light can reflect off objects around the vehicle. These reflections can be detected by a sensor of the lidar. Measuring how long the light takes to return to the sensor and measuring the wavelengths of the reflected light can enable making a three-dimensional model of the object being sensed and of the entire area around the vehicle 5.

FIG. 4 illustrates a diagrammatic view of portions of a self-driving vehicle 5, according to some embodiments. The self-driving vehicle 5 can include a vehicle navigation system 14, a communication system 16 that has a transmitter 18 and a receiver 17, a computing system 19 that has a processor 26, a memory 20 that has program instructions 27 and map information 28, a traffic monitor 23, and a drive-by-wire system 24. In some embodiments, at least some of these items are part of the detection system 7.

The vehicle navigation system 14 can be configured to enable the vehicle 5 to follow a driving route. The vehicle navigation system 14 can direct the vehicle toward a pick-up location.

The communication system 16 can be configured to communicate with a vehicle management system. The communication system 16 can be configured to communicate with a remote computing device of a rider. The communication system 16 can use an antenna 13 to communicate with other vehicles and other devices (such as a vehicle management system and remote computing devices) via intermediary communication systems 15.

Intermediary communication systems 15 can comprise wireless networks, Wi-Fi routers, Bluetooth systems, cellular networks, telephone networks, Internet systems, servers, cloud computing, remotely located computers, satellite systems, communication systems, and any other suitable means of enabling communication between the various components of embodiments described herein and/or incorporated by reference.

The drive-by-wire system 24 can be a computer-regulated system for controlling the engine, accelerating, braking, turning, handling, suspension, and/or other functions related to autonomously driving the vehicle 5.

In some embodiments, at least portions of a vehicle guidance system are located far away from vehicles 5, 5a, 5b, 5c. The vehicle guidance system can include software that is run on servers. The servers can communicate with vehicles 5, 5a, 5b, 5c via intermediary communication systems 15.

In some embodiments, portions of the vehicle guidance system are located in one or more vehicles 5, 5a, 5b, 5c and portions of the vehicle guidance system are located far away from the one or more vehicles 5, 5a, 5b, 5c.

Figure 5:
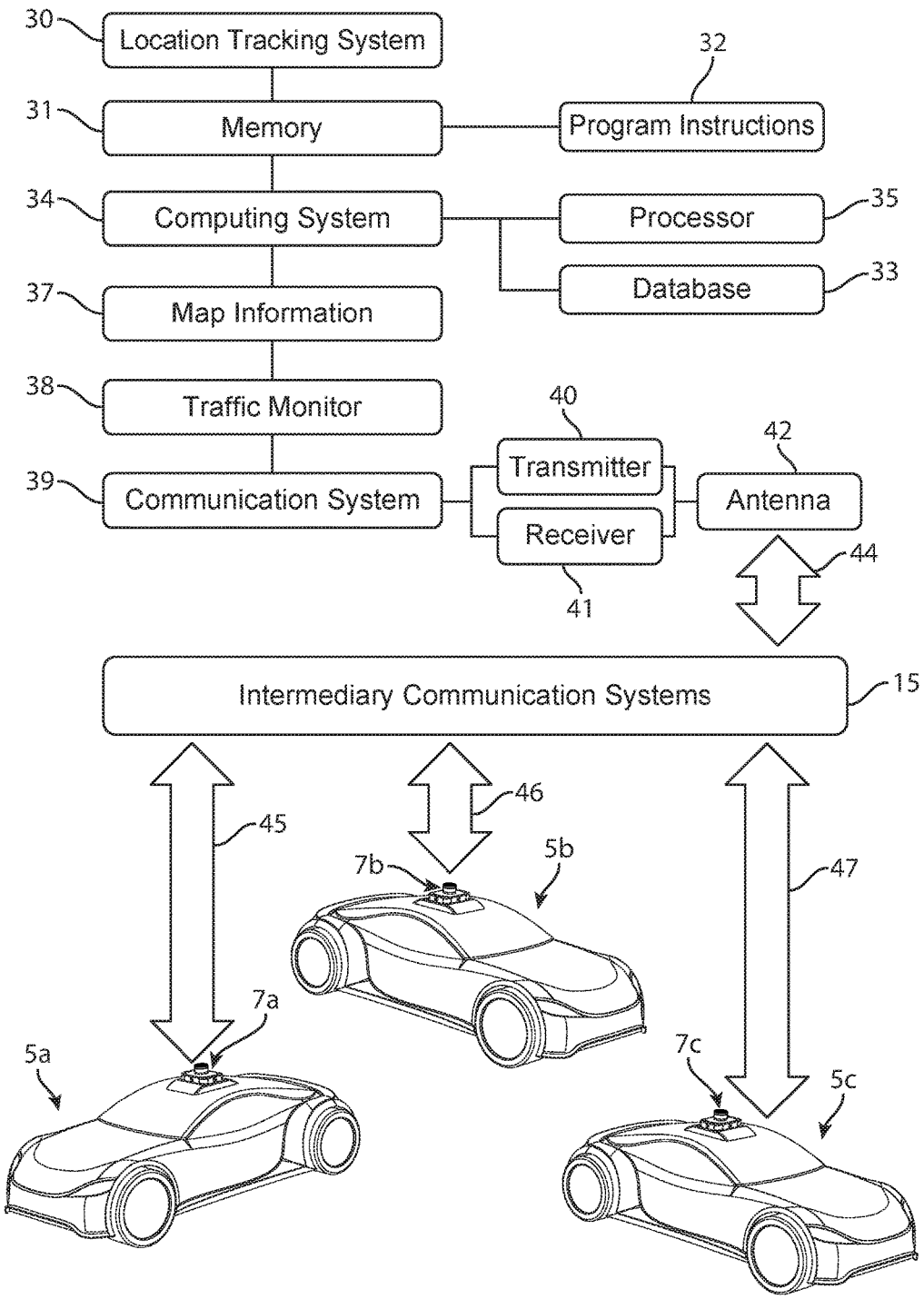
FIG. 5 illustrates a diagrammatic view of portions of a guidance system, according to some embodiments.

FIG. 5 illustrates a diagrammatic view of portions of a vehicle guidance system, according to some embodiments. FIG. 5 illustrates many optional items. Not all the items illustrated in FIG. 5 are necessarily part of each vehicle guidance system.

A vehicle guidance system can comprise a location tracking system 30 configured to track locations of vehicles 5, 5a, 5b, 5c and also configured to track locations of vehicles that have been identified as potentially impaired (according to indications collected by the vehicles 5, 5a, 5b, 5c).

The location tracking system 30 can receive GPS location data of the vehicles 5, 5a, 5b, 5c by the vehicles 5, 5a, 5b, 5c sending their GPS location data to the location tracking system 30 via intermediary communication systems 15.

The location tracking system 30 can comprise a computer configured to receive locations of vehicles. The location tracking system 30 can comprise a processor 35 and a memory 31 comprising program instructions 32 configured such that when executed by the processor 35 the program instructions 32 cause the location tracking system 30 to monitor locations of vehicles.

A vehicle guidance system can comprise a computing system 34 that includes one or more computers of any suitable type. Each computer can include a processor 35 and a memory 31 comprising program instructions 32 configured such that when executed by the processor 35 the program instructions 32 cause the vehicle guidance system to perform the methods described herein.

The vehicle guidance system can comprise map information 37 (including street information, preferred pick-up locations, and preferred drop-off locations) and a traffic monitor 38 configured to receive traffic information from third parties (e.g., Google Maps).

The vehicle guidance system can comprise a communication system 39 having a transmitter 40, a receiver 41, and an antenna 42. The communication system 39 can be configured to communicate with the vehicles 5, 5a, 5b, 5c. In some embodiments, the communication system 39 communicates with the vehicles 5, 5a, 5b, 5c via intermediary communication systems 15. The antenna 42 can be communicatively coupled to the antenna 13 shown in FIG. 4.

The antenna 42 can be communicatively coupled (e.g., via intermediary communication systems 15) with self-driving vehicles 5, 5a, 5b, 5c that can include a vehicle navigation system 14, a communication system 16 that has a transmitter 18 and a receiver 17, a computing system 19 that has a processor 26, a memory 20 that has program instructions 27 and map information 28, a traffic monitor 23, and a drive-by-wire system 24 (as illustrated in FIG. 4).

Communicative coupling may be via continuous communications or intermittent communications. Intermittent communications can be via periodic communications (e.g., every 1 second, every 60 seconds, every 10 minutes). As used herein, "periodically" does not imply that every period has the same duration. In some embodiments, the communicative coupling is via intermediary communication systems 15.

Each self-driving vehicle 5a, 5b, 5c can include all of the items described in the context of vehicle 5.

Vehicle 5a includes a lane position detection system detection system 7a that can include all of the items described in the context of detection system 7. Vehicle 5b includes a detection system 7b that can include all of the items described in the context of detection system 7. Vehicle 5c includes a detection system 7c that can include all of the items described in the context of detection system 7.

Figure 6:
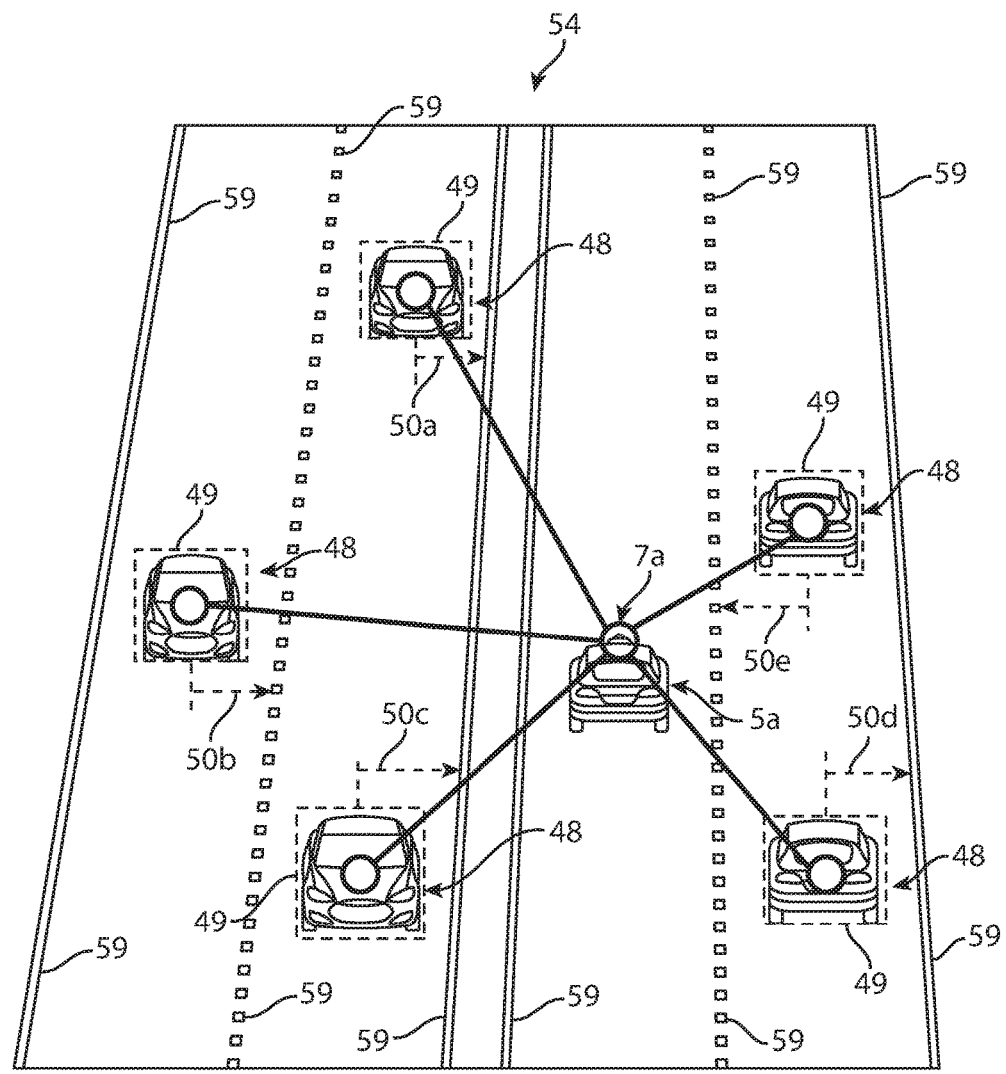
FIG. 6 illustrates a perspective view of a self-driving vehicle driving on a road, according to some embodiments.

FIG. 6 illustrates a perspective view of a first vehicle 5a driving on a road 54 having many lanes. The first vehicle 5a uses its first lane position detection system 7a to detect several vehicles 48. Although not noticeable to a human, one of the vehicles 48 has an impaired driver.

The detection system 7a can detect an outline 49 of each vehicle 48 using a camera 11, radar 8, and/or lidar 9. (The outlines 49 are depicted by broken line boxes in FIG. 6.) Detecting the outlines 49 can enable the detection system 7a to detect a center of each vehicle 48. (The centers are depicted by circles.) Measuring distances 50a, 50b, 50c, 50d, 50e from the centers to lane markers 59 enables the vehicle 5a to track paths of the vehicles 48.

Figure 7:
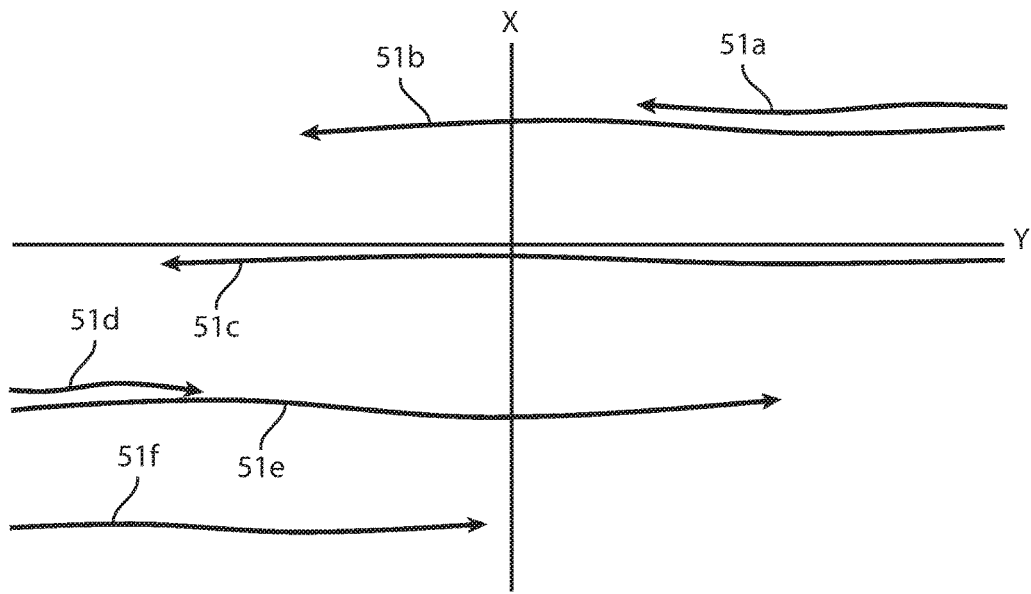
FIG. 7 illustrates a diagrammatic view of path data recorded by the self-driving vehicle shown in FIG. 6, according to some embodiments.

FIG. 7 illustrates a diagrammatic view of the path data recorded by the first vehicle 5a. (The paths 51a, 51b, 51c, 51d, 51e, or 51f shown in FIG. 7 are of the vehicles 48 shown in FIG. 6.) The first vehicle 5a is located at the origin of the X axis and the Y axis. The Y axis represents the direction of travel along the road. The X axis represents movement to a left side or ride side of the road 54.

Figure 8:
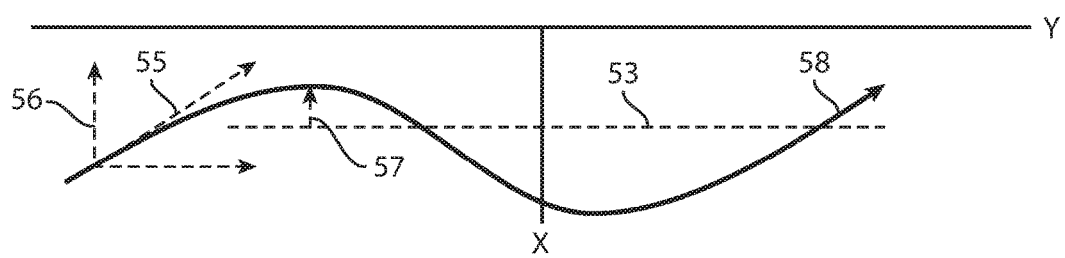
FIG. 8 illustrates a diagrammatic view of exaggerated movements of a vehicle to permit people to see the movements of the vehicle, according to some embodiments.

FIG. 8 represents a diagrammatic view of a path 58 of a vehicle. The movements of the vehicle in the X direction have been exaggerated in FIG. 8 to enable the movements of the vehicle in the X direction to be noticeable to people who view FIG. 8. A vehicle's travel can be represented by a vector, which can be split into X and Y components.

In some embodiments, a vehicle guidance system comprises a first vehicle 5a comprising a first lane position detection system 7a having at least one of a first camera 11, a first radar 8 and a first lidar 9. The first lane position detection system 7a can be configured to record a first path (e.g., 51a, 51b, 51c, 51d, 51e, or 51f) of a second vehicle 48 as the first vehicle 5a and the second vehicle 48 travel on a first road 54. The vehicle guidance system can comprise a processor system (e.g., 35 and/or 26) configured to analyze a first deviation (e.g., 55, 56, 57) of the first path (e.g., 51a, 51b, 51c, 51d, 51e, or 51f) of the second vehicle 48 relative to a first lane of the first road 54.

The vehicle guidance system can be configured to receive (from the first vehicle 5a) a first indicator of the second vehicle 48 driving impaired. The vehicle guidance system can be configured to receive (from a third vehicle 5b) a second indicator of the second vehicle 48 driving impaired.

In some embodiments, a vehicle guidance system is configured to receive a first impaired driving indicator. A vehicle guidance system can comprise a first vehicle 5a comprising a first lane position detection system 7a having at least one of a first camera 11, a first radar 8 and a first lidar 9. The first lane position detection system 7a can be configured to record a first path (e.g., 51a, 51b, 51c, 51d, 51e, or 51f) of a second vehicle 48 as the first vehicle 5a and the second vehicle 48 travel on a first road 54. A vehicle guidance system can comprise a processor system (e.g., 35 and/or 26) configured to analyze a first deviation of the first path (e.g., 51a, 51b, 51c, 51d, 51e, or 510) of the second vehicle 48 relative to a first lane of the first road 54.

FIG. 8 illustrates exaggerated deviations 55, 56, 57 to enable people to see the deviations 55, 56, 57. Deviations can be measured as departures from a typical path of vehicles in a particular lane, departures from a center of a lane, differences in distances 50a, 50b, 50c, 50d, 50e to lane markers 59, movements back and forth across a median and/or average travel path 53 of a vehicle 48, movements toward a left side of a lane, movements toward a right side of a lane, and any departure away from a direction of the road 54.

If a road is configured to enable cars to drive directly west, then the direction of the road 54 is directly west. Some roads enable travel in opposite directions, which means that one side of the road may head directly west (and have a west direction) and the other side of the road may head directly east (and have an east direction).

In some embodiments, a first vehicle 5a detects indications that a second vehicle 48 is impaired and records characteristics of the second vehicle 48. The characteristics (e.g., a license plate number or a digital description of a physical appearance of the second vehicle 48) are sent to a third vehicle 5b. Later, the third vehicle 5b recognizes the second vehicle 48, follows the second vehicle 48, and warns other vehicles (e.g., a fourth vehicle 5c) about the second vehicle 48. This warning can be in the form of a wireless communication (which can be a direct wireless radio communication) from the third vehicle 5b to any vehicle within a communication range of the third vehicle 5b. This warning can be in the form of a wireless communication (which can be an indirect wireless communication) from the third vehicle 5b to any vehicle within a predetermined distance of the third vehicle 5b. The communication can prompt other vehicles to take extra precautions around the second vehicle 48 and/or can prompt other vehicles to keep away from the second vehicle 48.

In some cases, a first deviation recorded by the first vehicle 5a may not be sufficient evidence to suspect that the second vehicle 48 is impaired. Later, a third vehicle 5b may encounter the same second vehicle 48. The third vehicle 5b can collect additional evidence about the driving of the second vehicle 48. Analyzing this additional evidence in light of the evidence recorded by the first vehicle 5a may be sufficient to determine that the second vehicle 48 is impaired (even though the evidence collected by just the first vehicle 5a was insufficient).

Some embodiments comprise comparing the first and second deviations to identify paths indicative of impaired driving. Some embodiments comprise sending a communication configured to prompt the fourth vehicle 5c to keep away from the second vehicle 48 in response to comparing the first and second deviations and/or in response to the first deviation and the second deviation being indicative of impaired driving.

In some embodiments, a vehicle guidance system comprises a third vehicle 5b comprising a second lane position detection system 5b having at least one of a second camera 11, a second radar 8 and a second lidar 9. The second lane position detection system 5b can be configured to record a second path of the second vehicle 48 as the third vehicle 5b and the second vehicle 48 travel on a second road. The processor system (e.g., 35 and/or 26) can be configured to analyze a second deviation of the second path of the second vehicle 48 relative to a second lane of the second road.

In some embodiments, a vehicle guidance system comprises a communication system (e.g., 16 and/or 39) configured to send a first communication to a fourth vehicle 5c in response to the first deviation being greater than a first predetermined threshold and the second deviation being greater than a second predetermined threshold. The first communication can be configured to prompt the fourth vehicle 5c to alter a first driving route of the fourth vehicle 5c to keep away from the second vehicle 48.

Figure 9:
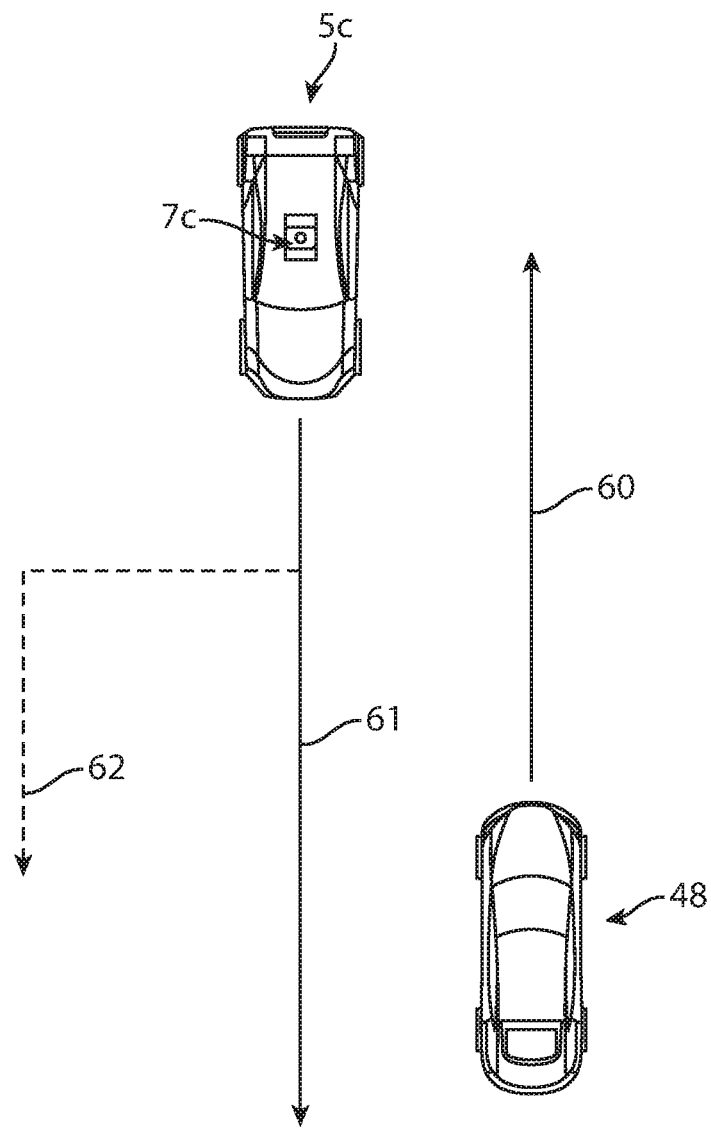
FIG. 9 illustrates a top view of driving routes, according to some embodiments.

FIG. 9 illustrates a top view of the second vehicle 48 having a driving route 60. The fourth vehicle 5c has an original driving route 61 that could bring the fourth vehicle 5c within a close range of the potentially impaired driver of the second vehicle 48. In response to receiving the first communication, the fourth vehicle 5c alters its driving route to keep away from the second vehicle (e.g., as indicated by the updated driving route 62 shown by the broken line). Altering the driving route can comprise changing lanes to keep away from the second vehicle 48. Altering the driving route can comprise changing roads to keep away from the second vehicle 48.

In some embodiments, the first lane position detection system 7a is configured to compensate for motion of the first vehicle 5a to determine a speed of the second vehicle 48. The first lane position detection system 7a can be configured to compensate for the motion of the first vehicle 5a to determine movements of the second vehicle 48 toward at least one of a left side of the first lane and a right side of the first lane. (Deviations 55, 56, 57 in FIG. 8 illustrate embodiments of deviations toward at least one of a left side of a first lane and a right side of the first lane.) The processor system (e.g., 35 and/or 26) can be configured to analyze the first deviation based on the speed and the movements.

To increase the clarify of certain items in FIG. 6, not all of the lane markers 59 are labeled. Lane markers 59 can included dashed painted lines, solid painted lines, reflectors, guard rails, cement median barriers, traffic cones and any other item used to indicate to drivers and/or to self-driving vehicles where lanes are located. In some cases, lanes are marked by digital beacons that enable self-driving vehicles to detect a left side, a center, and/or a right side of a lane.

In some embodiments, the first lane position detection system 7a comprises a first camera 11. The first camera 11 of the first vehicle 5a can be configured to record lane markers 59 of the first lane. The first camera 11 can be configured to record the first path (e.g., 51a, 51b, 51c, 51d, 51e, or 51f) of the second vehicle 48 to enable the processor system (e.g., 35 and/or 26) to analyze the first deviation by comparing the first path (e.g., 51a, 51b, 51c, 51d, 51e, or 51f) relative to positions of the lane markers 59.

In some embodiments, the first lane position detection system 7a comprises the first camera 11 and at least one of the first lidar 9 and the first radar 8. The first camera 11 can be configured to identify lane markers 59 of the first lane.

In some embodiments, the first lidar 9 is configured to identify the first path (e.g., 51a, 51b, 51c, 51d, 51e, or 510 of the second vehicle 48 to enable the processor system (e.g., 35 and/or 26) to analyze the first deviation by comparing the first path (e.g., 51a, 51b, 51c, 51d, 51e, or 510 relative to positions of the lane markers 59.

In some embodiments, the first radar 8 is configured to identify the first path (e.g., 51a, 51b, 51c, 51d, 51e, or 510 of the second vehicle 48 to enable the processor system (e.g., 35 and/or 26) to analyze the first deviation by comparing the first path (e.g., 51a, 51b, 51c, 51d, 51e, or 51f) relative to positions of the lane markers 59.

In some embodiments, a vehicle guidance system comprises a communication system (e.g., 16 and/or 39) configured to send a first communication to a fourth vehicle 5c in response to the first deviation being greater than a predetermined threshold and/or indicative of impaired driving. The first communication can be configured to prompt the fourth vehicle 5c to alter a first driving route of the fourth vehicle 5c to keep away from the second vehicle 48. The first communication can be configured to prompt the fourth vehicle 5c to move away from the second vehicle 48.

In some embodiments, the first camera 11 of the first vehicle 5a is configured to take an image of the second vehicle 48. An image can be a still picture and/or a video. The vehicle guidance system can comprise an image analysis system configured to identify at least one characteristic of the second vehicle 48 by analyzing the image taken by the first vehicle 5a.

The image may show a color of the second vehicle 48. The characteristic can be the color of the second vehicle 48.

The image may show one or more views of the second vehicle 48. The image analysis system can analyze the views of the second vehicle 48 to determine a make, model, and approximate year of the second vehicle 48. For example, the image may show a vehicle that the image analysis determines is a 2013 Blue Toyota Tundra. The characteristic can be data that communicates "2013 Blue Toyota Tundra" so other vehicles can recognize the impaired vehicle.

In some embodiments, the characteristic is a license plate identification (that can include numbers and letters). The license plate identification can be something like "DFJ2389" or any other combination of letters and numbers. Receiving the license plate identification can enable other vehicles (e.g., a fourth vehicle 5c) to recognize the impaired vehicle (e.g., by the fourth vehicle 5c using a camera 11 to take a picture of the impaired vehicle and then using image analysis software to identify the numbers and letters on the license plate of the impaired vehicle).

In some embodiments, the communication system (e.g., 16 and/or 39) is configured to send a second communication having the at least one characteristic to the fourth vehicle 5c to enable the fourth vehicle 5c to keep away from the second vehicle 48 in response to receiving the first communication and in response to identifying the second vehicle 48 based on the at least one characteristic of the second communication.

In some embodiments, the least one characteristic comprises at least one of a color of the second vehicle 48, a shape of the second vehicle 48, a license plate identification of the second vehicle 48, a make of the second vehicle 48, and a model of the second vehicle 48.

In some embodiments, the vehicle guidance system comprises a database 33 having vehicle characteristic data. The vehicle guidance system can be configured to compare the at least one characteristic of the second vehicle 48 to the database 33 to determine physical identification information of the second vehicle 48 that is more precise than the at least one characteristic.

For example, the characteristic could just be one view of the impaired vehicle. The system can compare the one view to the vehicle characteristic data in the database 33 to identify more precise information about the vehicle (e.g., to identify the make and model of the vehicle and/or to identify three dimensional data regarding the vehicle). Then, the system can send the physical identification information that includes the make of the vehicle, the model of the vehicle, data regarding the three dimensional shape of the vehicle and/or that includes views of all sides of the vehicle (rather than just the one view of the impaired vehicle). This more precise information can enable other vehicles (e.g., the fourth vehicle 5c) to be more likely to successfully recognize the impaired vehicle in the near future.

Lidar and radar can be used to create a three dimensional representation of a shape of a vehicle. This shape information can be used to enable others to identify the vehicle (e.g., by detecting a similar shape).

In some embodiments, the first lane position detection system 7a comprises at least one of the first lidar 9 and the first radar 8. At least one of the first lidar 9 and the first radar 8 can be configured to detect an indication of a shape of the second vehicle 48.

In some embodiments, the vehicle guidance system comprises a database 33 having vehicle shape data. The vehicle guidance system can be configured to compare the indication of the shape to the vehicle shape data to determine physical identification information of the second vehicle 48, In some embodiments, a communication system (e.g., 16 and/or 39) is configured to send a second communication comprising the physical identification information to the fourth vehicle 5c to enable the fourth vehicle 5c to keep away from the second vehicle 48 in response to receiving the first communication and in response to identifying the second vehicle 48 based on the physical identification information.

Even if a vehicle is impaired, other vehicles do not necessarily need to be bothered with an impaired vehicle warning if the other vehicles are located far away from the impaired vehicle.

In some embodiments, the vehicle guidance system comprises a location tracking system configured to receive a first location indicator of the second vehicle 48. The location tracking system can be configured to receive a second location indicator of the fourth vehicle 5c.

In some embodiments, the communication system (e.g., 16 and/or 39) can be configured to send the first communication to the fourth vehicle 5c in response to the location tracking system determining, based on the first location indicator and the second location indicator, that the fourth vehicle 5c is within a first predetermined distance of the second vehicle 48.

In some embodiments, the vehicle guidance system comprises a location tracking system configured to monitor a second driving route of the second vehicle 48 and configured to monitor the first driving route of the fourth vehicle 5c.

Monitoring the second driving route of the second vehicle 48 might comprise collecting data regarding a location of the second vehicle 48 and a direction in which the second vehicle 48 is heading (e.g., the second vehicle 48 is located at 2121 Main Street and is heading south).

Many self-driving vehicles, which periodically recognize the second vehicle 48, can monitor a second driving route of the second vehicle 48. After one self-driving vehicle stops detecting the second vehicle 48 (e.g., because the second vehicle 48 turned onto a different street and thereby moved away from the self-driving vehicle) another self-driving vehicle (that is on the different street) may soon detect the second vehicle 48.

In some embodiments, a third self-driving vehicle 5b follows the second vehicle 48 (e.g., as the second vehicle 48 drives down a road) to monitor a second driving route of the second vehicle 48.

In some embodiments, the communication system (e.g., 16 and/or 39) is configured to send the first communication to the fourth vehicle 5c in response to the location tracking system predicting, based on the first driving route and the second driving route, that the fourth vehicle 5c would come within a predetermined distance of the second vehicle 48. The predetermined distance can be greater than 10 feet, greater than 100 feet, less than 500 feet, less than 1 mile and/or less than 5 miles.

In some embodiments, the first lane position detection system 7a is configured to compensate for motion of the first vehicle 5a to determine a speed of the second vehicle 48 and to determine movements of the second vehicle 48 toward at least one of a left side of the first lane and a right side of the first lane. The processor system (e.g., 35 and/or 26) can be configured to analyze the movements compared to the speed to determine that the first path (e.g., 51a, 51b, 51c, 51d, 51e, or 51f) relative to the first lane fluctuates more than a speed-relative threshold.

Traveling faster can magnify the deviations due to a driver being impaired. For example, if front wheels of the second vehicle 48 are pointed three degrees away from a central axis of a lane for two seconds, the deviation towards the left (or right) side of the road will be far greater if the second vehicle 48 is traveling at 75 miles per hour than if the second vehicle 48 is traveling at 25 miles per hour. (The central axis of the lane runs along the middle of the line in the direction of the lane.) Thus, analyzing the movements (toward at least one of a left side of the first lane and a right side of the first lane) compared to the speed can result in much more actionable data. A speed-relative threshold is a threshold that is higher (or lower) at a high speed than at a low speed.

In some embodiments, the vehicle guidance system further comprises a communication system (e.g., 16 and/or 39) configured to send a first communication to a fourth vehicle 5c in response to the first path (e.g., 51a, 51b, 51c, 51d, 51e, or 51o fluctuating more than the speed-relative threshold. The first communication can be configured to prompt the fourth vehicle 5c to alter a first driving route of the fourth vehicle 5c to keep away from the second vehicle 48.

Some embodiments comprise methods of using a vehicle guidance system. Some embodiments comprise receiving from a first vehicle 5a, by the vehicle guidance system, a first indicator of a second vehicle 48 driving impaired; and/or receiving from a third vehicle 5b, by the vehicle guidance system, a second indicator of the second vehicle 48 driving impaired.

Some embodiments comprise determining to send a first communication in response to analyzing the first indicator and the second indicator. Analyzing data from both the first vehicle 5a and the third vehicle 5b can provide more accurate impairment predictions than only analyzing data from the first vehicle 5a or the third vehicle 5b.

Some embodiments comprise sending, from the vehicle guidance system to a fourth vehicle 5c, a first communication configured to prompt the fourth vehicle 5c to alter a first driving route of the fourth vehicle 5c to keep away from the second vehicle 48 in response to determining, by the vehicle guidance system, that the first indicator and the second indicator are indicative of impaired driving. Some embodiments comprise sending, from the vehicle guidance system to the fourth vehicle 5c, the first communication in response to analyzing data from both the first vehicle 5a and the third vehicle 5b.

In some embodiments, determining that the first indicator is indicative of impaired driving comprises: recording, by the first vehicle 5a, a first path (e.g., 51a, 51b, 51c, 51d, 51e, or 51t) of the second vehicle 48 relative to lane markers 59 as the first vehicle 5a and the second vehicle 48 travel on a first road 54; compensating for motion of the first vehicle 5a to determine a speed of the second vehicle 48; compensating for the motion of the first vehicle 5a to determine movements of the second vehicle 48 toward at least one of a left side of the first road 54 and a right side of the first road 54; and/or analyzing the movements compared to the speed to determine that the first path (e.g., 51a, 51b, 51c, 51d, 51e, or 51f) relative to the lane markers 59 fluctuates more than a speed-relative threshold.

As used herein, "fluctuate" is used broadly and means to shift back and forth (e.g., toward a left side of a road and/or toward a right side of the road).

In some embodiments, the first indicator comprises lane control data based on the first vehicle 5a recording a first path (e.g., 51a, 51b, 51c, 51d, 51e, or 51f) of the second vehicle 48 relative to lane markers 59 as the first vehicle 5a and the second vehicle 48 travel on a first road 54. Some embodiments comprise analyzing, by at least one of the vehicle guidance system and the first vehicle 5a, the first path (e.g., 51a, 51b, 51c, 51d, 51e, or 51f) relative to the lane markers 59.

As used herein, "lane control data" is used broadly and refers to data regarding how well a vehicle stays within a center of a lane. Exiting a lane indicates poor lane control. Fluctuating back and forth in a lane indicates poor lane control.

In some embodiments, the second indicator comprises lane exit data based on the third vehicle 5b recording the second vehicle 48 exiting a lane of a second road. and then reentering a lane of a second road. The second indicator can comprise lane exit data based on the third vehicle 5b recording the second vehicle 48 exiting a lane of a second road and then reentering the lane of the second road.

As used herein, "lane exit data" is used broadly and refers to data a vehicle exiting a lane (e.g., inadvertently). Switching lanes without using a blinker is evidence of inadvertently exiting a lane. Exiting a lane and then immediately reentering the lane is evidence of inadvertently exiting a lane.

In some embodiments, the second indicator comprises detecting, by the third vehicle 5b, that the second vehicle 48 is traveling (e.g., moving) on a second road at least five miles per hour slower than a speed limit of the second road. In some embodiments, the second indicator comprises detecting, by the third vehicle 5b, that the second vehicle 48 is traveling on a second road at least five miles per hour faster than the speed limit of the second road. A vehicle that is moving 75 miles per hour is traveling 75 miles per hour. The traveling speed is the instantaneous speed (not, for example, an average speed over a period of time).

In some embodiments, the second indicator comprises detecting, by the third vehicle 5b, that the second vehicle 48 is traveling at night without illuminated headlights. "Without illuminated headlights" means that the headlights are not "turned on."

In some embodiments, the first indicator comprises lane control data based on the first vehicle 5a recording a position of the second vehicle 48 as the second vehicle 48 travels in a lane of a first road 54. Embodiments can comprise analyzing, by at least one of the vehicle guidance system and the first vehicle 5a, a deviation of a first path (e.g., 51a, 51b, 51c, 51d, 51e, or 51f) of the second vehicle 48 along the lane relative to lane markers 59 of the first road 54.

In some embodiments, the first indicator comprises lane control data based on the first vehicle 5a recording a position of the second vehicle 48 as the second vehicle 48 travels in a lane of a first road 54. Embodiments can comprise analyzing, by at least one of the vehicle guidance system and the first vehicle 5a, a deviation of a first path (e.g., 51a, 51b, 51c, 51d, 51e, or 51f) of the second vehicle 48 along the lane relative to a typical path along the lane.

As used herein, the "typical path" is a theoretical path based on data from multiple vehicles that travel in the lane. Embodiments can comprise formulating, by the vehicle guidance system, the typical path along the lane by aggregating lane position data of automobiles as the automobiles travel along the lane. For example, the typical path can be an average path or median path of many cars as they travel along the lane.

Ss used herein, an "automobile" can be any type of vehicle.

In some embodiments, the first indicator comprises speed data based on the first vehicle 5a recording a speed of the second vehicle 48. Embodiments can comprise determining, by at least one of the vehicle guidance system and the first vehicle 5a, that the speed is at least one of at least eight miles per hour faster and at least eight miles slower than a speed limit of a location of the second vehicle 48.

Speeding up or slowing down when unnecessary, too often or at odd times (e.g., when not warranted by the road, road signs, or traffic) can be an indication of impaired driving. In some embodiments, the first indicator comprises acceleration data based on the first vehicle 5a recording an acceleration of the second vehicle 48. Embodiments can comprise analyzing, by at least one of the vehicle guidance system and the first vehicle 5a, changes in the acceleration to enable the vehicle guidance system to determine that the first indicator is indicative of the impaired driving.

In some embodiments, the first indicator comprises a first lane control data based on the first vehicle 5a recording a first path (e.g., 51a, 51b, 51c, 51d, 51e, or 51f) of the second vehicle 48 as the second vehicle 48 travels in a first lane of a first area. Embodiments can comprise analyzing, by at least one of the vehicle guidance system and the first vehicle 5a, a first deviation of the first path (e.g., 51a, 51b, 51c, 51d, 51e, or 510 relative to the first lane. The second indicator can comprise a second lane control data based on the third vehicle 5b recording a second path of the second vehicle 48 as the second vehicle 48 travels in a second lane of a second area. Embodiments can comprise analyzing, by at least one of the vehicle guidance system and the third vehicle 5b, a second deviation of the second path relative to the second lane.

Some embodiments comprise, in response to analyzing the first deviation and the second deviation, sending, from the vehicle guidance system to a fourth vehicle 5c, a first communication configured to prompt the fourth vehicle 5c to keep away from the second vehicle 48.

Some embodiments comprise sending, from the vehicle guidance system to the fourth vehicle 5c, the first communication in response to considering (e.g., by at least one of the vehicle guidance system, the first vehicle 5a, and the third vehicle 5b) a combined evidence of both the first deviation and the second deviation.

As used herein, "combined evidence" is evidence that is used together (e.g., to enable a decision as to whether a deviation of a vehicle is so large that the deviation is indicative of the driver being impaired). For example, a first deviation could be suspect, but too low to conclude that the driver is likely impaired and too low to justify warning other vehicles. The first deviation combined with a second suspect deviation could be strong enough combined evidence to conclude that other vehicles should stay away from the deviating vehicle.

In some cases, compound evidence of driving of the second vehicle 48 (based on information from multiple vehicles 5a, 5b can be a far better predictor of impaired driving than evidence from a single vehicle (e.g., 5a or 5b).

As used herein, "compound evidence" is created by combining evidence from multiple vehicles (e.g., 5a and 5b).

Some embodiments comprise receiving, by the vehicle guidance system, from the first vehicle 5a a first location indicator of the second vehicle 48; determining, by the vehicle guidance system based on the first location indicator, that a fourth vehicle 5c is within a first predetermined distance of the second vehicle 48; and/or in response, sending, from the vehicle guidance system to the fourth vehicle 5c, a first communication configured to prompt the fourth vehicle 5c to alter a first driving route of the fourth vehicle 5c to keep away from the second vehicle 48.

In some embodiments, the first location indicator might not be an exact location, but might be a location of the first vehicle 5a when the first vehicle 5a recorded the second vehicle 48. In some embodiments, the first location indicator can include a direction in which the second vehicle 48 was traveling (e.g., when recorded by the first vehicle 5a).

Some embodiments comprise receiving, by the vehicle guidance system, from the first vehicle 5a a first location indicator of the second vehicle 48; receiving, by the vehicle guidance system, a second location indicator of a fourth vehicle 5c; determining, by the vehicle guidance system based on the first location indicator and the second location indicator, that the fourth vehicle 5c is on a first driving route that would come within a predetermined distance of the second vehicle 48; and/or in response sending, from the vehicle guidance system to the fourth vehicle 5c, a first communication configured to prompt the fourth vehicle 5c to alter the first driving route of the fourth vehicle 5c to keep away from the second vehicle 48.

Interpretation

To reduce unnecessary redundancy, not every element or feature is described in the context of every embodiment, but all elements and features described in the context of any embodiment herein and/or incorporated by reference can be combined with any elements and/or features described in the context of any other embodiments.

The self-driving vehicle can be any suitable vehicle. For example, the self-driving vehicle can be a Tesla Model S made by Tesla, Inc. The Tesla Model S can include the Enhanced Autopilot package and the Full Self-Driving Capability package. The Full Self-Driving Capability package includes eight active cameras to enable full self-driving in almost all circumstances.

The self-driving vehicle can also be a Waymo car. Waymo was formerly the Google self-driving car project. Waymo, which is owned by Alphabet Inc., has logged thousands of self-driving miles over many years. Waymo vehicles have sensors and software that are designed to detect pedestrians, cyclists, vehicles, roadwork and more from a distance of up to two football fields away in all directions. Waymo has stated that its software leverages over four million miles of real-world driving data. In some embodiments, self-driving vehicles sometimes drive themselves, sometimes are driven remotely by a computing system, and sometimes are driven manually by a human turning a steering wheel, operating pedals, and performing other driver functions. In several embodiments, a self-driving vehicle drives without a human inside the vehicle to pick up the human and then lets the human drive the vehicle. Although in some cases, the human may choose not to drive the vehicle and instead may allow the vehicle to drive itself (e.g., steer and control speed) (e.g., in response to a destination requested by the human).

A remote computing device can be a smartphone, a tablet computer, a laptop computer, a desktop computer, a server, augmented reality glasses, an implanted computer, and/or any type of computer. A rider can bring her remote computing device into the self-driving vehicle, use her remote computing device in the self-driving vehicle, and leave the self-driving vehicle with her remote computing device. In some embodiments, the rider requests a ride at her home with a remote computing device, but then leaves the remote computing device at home when she goes to get a ride from the self-driving vehicle.

In some embodiments, the remote computing device is an iPhone made by Apple Inc. or an Android phone based on software made by Alphabet Inc. The remote computing device can comprise a speaker configured to emit sounds, a microphone configured to record sounds, and a display screen configured to display images. The remote computing device can comprise a battery configured to provide electrical power to operate the remote computing device.

The phrase "communicatively coupling" can include any type of direct and/or indirect coupling between various items including, but not limited to, a self-driving vehicle, a remote computing device, and a vehicle management system. For example, a remote computing device can be communicatively coupled to a vehicle management system via servers, the Cloud, the Internet, satellites, Wi-Fi networks, cellular networks, and any other suitable communication means.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, refers to both native apps and mobile cloud apps (and Web apps). Native apps can be installed directly on remote computing devices, whereby developers can create separate app versions for each type of remote computing device (e.g., iPhone devices and Android devices). Native apps may be stored on the remote computing device out of the box, or the native apps can be downloaded from a public or private app store and installed on the remote computing device. Self-driving vehicle data associated with native apps can be stored on the remote computing device and/or can be stored remotely and accessed by the native app. Internet connectivity may be used by some instances of apps. Other instances of apps may not use Internet connectivity. In some embodiments, apps can function without Internet connectivity.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" refers to both native apps and mobile cloud apps.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The invention claimed is:

1. A vehicle guidance system configured to receive a first impaired driving indicator, the vehicle guidance system comprising:
a first vehicle comprising a first lane position detection system configured to generate three dimensional data representing an area outside the first vehicle and having at least one of a first radar and a first lidar, wherein the first lane position detection system is configured to track a first path of a second vehicle as the first vehicle and the second vehicle travel on a first road;
a processor system configured to analyze a first deviation of the first path of the second vehicle relative to a first lane of the first road; and
a communication system configured to send a first communication to a third vehicle in response to the first deviation being greater than a first predetermined threshold, wherein the first communication is configured to prompt the third vehicle to alter a first driving route of the third vehicle to keep away from the second vehicle.

2. The vehicle guidance system of claim 1, further comprising a fourth vehicle comprising a second lane position detection system having at least one of a second radar and a second lidar, wherein the second lane position detection system is configured to track a second path of the second vehicle as the fourth vehicle and the second vehicle travel on a second road, the processor system is configured to analyze a second deviation of the second path of the second vehicle relative to a second lane of the second road, and the communication system is configured to send the first communication to the third vehicle in response to the first deviation being greater than the first predetermined threshold and the second deviation being greater than a second predetermined threshold.

3. The vehicle guidance system of claim 1, wherein the first lane position detection system is configured to compensate for motion of the first vehicle to determine a speed of the second vehicle, and the first lane position detection system is configured to compensate for the motion of the first vehicle to determine movements of the second vehicle toward at least one of a left side of the first lane and a right side of the first lane, and the processor system is configured to analyze the first deviation based on the speed and the movements.

4. The vehicle guidance system of claim 1, wherein the first lane position detection system comprises a first camera configured to identify lane markers of the first lane to enable the processor system to analyze the first deviation by comparing the first path relative to positions of the lane markers.

5. The vehicle guidance system of claim 1, wherein the first lane position detection system comprises a first camera and the first lidar, the first camera is configured to identify lane markers of the first lane, and the first lidar is configured to identify the first path of the second vehicle to enable the processor system to analyze the first deviation by comparing the first path relative to positions of the lane markers.

6. The vehicle guidance system of claim 1, wherein the first vehicle comprises a first camera configured to take an image of the second vehicle, and the vehicle guidance system comprises an image analysis system configured to identify at least one characteristic of the second vehicle by analyzing the image taken by the first vehicle,
wherein the communication system is configured to send a second communication having the at least one characteristic to the third vehicle to enable the third vehicle to keep away from the second vehicle in response to receiving the first communication and in response to identifying the second vehicle based on the at least one characteristic of the second communication.

7. The vehicle guidance system of claim 6, wherein the least one characteristic comprises at least one of a color, a shape, a license plate identification, a make, and a model of the second vehicle.

8. The vehicle guidance system of claim 6, wherein the vehicle guidance system comprises a database having vehicle characteristic data, and the vehicle guidance system is configured to compare the at least one characteristic of the second vehicle to the database to determine physical identification information of the second vehicle that is more precise than the at least one characteristic.

9. The vehicle guidance system of claim 1, wherein at least one of the first lidar and the first radar is configured to detect an indication of a shape of the second vehicle,
wherein the vehicle guidance system comprises a database having vehicle shape data, and the vehicle guidance system is configured to compare the indication of the shape to the vehicle shape data to determine physical identification information of the second vehicle,
wherein the communication system is configured to send a second communication comprising the physical identification information to the third vehicle to enable the third vehicle to keep away from the second vehicle in response to receiving the first communication and in response to identifying the second vehicle based on the physical identification information.

10. The vehicle guidance system of claim 1, further comprising a location tracking system configured to receive a first location indicator of the second vehicle and configured to receive a second location indicator of the third vehicle, wherein the communication system is configured to send the first communication to the third vehicle in response to the first deviation being greater than the first predetermined threshold and in response to the location tracking system determining, based on the first location indicator and the second location indicator, that the third vehicle is within a first predetermined distance of the second vehicle.

11. The vehicle guidance system of claim 1, further comprising a location tracking system configured to monitor a second driving route of the second vehicle and configured to monitor the first driving route of the third vehicle, wherein the communication system is configured to send the first communication to the third vehicle in response to the first deviation being greater than the first predetermined threshold and in response to the location tracking system predicting, based on the first driving route and the second driving route, that the third vehicle would come within a predetermined distance of the second vehicle.

12. The vehicle guidance system of claim 1, wherein the first lane position detection system is configured to analyze the three dimensional data to track the first path of the second vehicle.

13. A method of using a vehicle guidance system, the method comprising:

receiving from a first vehicle, by the vehicle guidance system, a first indicator of a second vehicle driving impaired, wherein the first vehicle comprises a first lane position detection system configured to generate three dimensional data that represents an area outside the first vehicle, and the first lane position detection system comprises at least one of a first radar and a first lidar;

receiving from a third vehicle, by the vehicle guidance system, a second indicator of the second vehicle driving impaired; and sending, from the vehicle guidance system to a fourth vehicle, a first communication configured to prompt the fourth vehicle to alter a first driving route of the fourth vehicle to keep away from the second vehicle in response to determining, by the vehicle guidance system, that the first indicator and the second indicator are indicative of impaired driving.

14. The method of claim 13, wherein determining that the first indicator is indicative of the impaired driving comprises:

recording, by the first vehicle, a first path of the second vehicle relative to lane markers as the first vehicle and the second vehicle travel on a first road, compensating for motion of the first vehicle to determine a speed of the second vehicle, compensating for the motion of the first vehicle to determine movements of the second vehicle toward at least one of a left side of the first road and a right side of the first road, and analyzing the movements compared to the speed to determine that the first path relative to the lane markers fluctuates more than a speed-relative threshold.

15. The method of claim 13, wherein the first indicator comprises first lane control data based on the first vehicle recording a first path of the second vehicle relative to lane markers as the first vehicle and the second vehicle travel on a first road, the method further comprising analyzing, by at least one of the vehicle guidance system and the first vehicle, the first path relative to the lane markers.

16. The method of claim 15, wherein the second indicator comprises second data based on detecting, by the third vehicle, that the second vehicle is traveling on a second road at least one of at least five miles per hour slower or at least five miles per hour faster than a speed limit of the second road.

17. The method of claim 15, wherein the second indicator comprises second data based on detecting, by the third vehicle, that the second vehicle is traveling at night without illuminated headlights.

18. The method of claim 13, wherein the first indicator comprises lane control data based on the first vehicle tracking a position of the second vehicle as the second vehicle travels in a lane of a first road, the method further comprising analyzing, by at least one of the vehicle guidance system and the first vehicle, a deviation of a first path of the second vehicle along the lane.

19. The method of claim 13, wherein the first indicator comprises lane control data based on the first vehicle recording a position of the second vehicle as the second vehicle travels in a lane of a first road, the method further comprising analyzing, by at least one of the vehicle guidance system and the first vehicle, a deviation of a first path of the second vehicle along the lane relative to a typical path along the lane, and formulating, by the vehicle guidance system, the typical path along the lane by aggregating lane position data of automobiles as the automobiles travel along the lane.

20. The method of claim 13, wherein the first indicator comprises speed data based on the first vehicle recording a speed of the second vehicle, the method further comprising determining, by at least one of the vehicle guidance system and the first vehicle, that the speed is at least one of at least eight miles per hour faster and at least eight miles slower than a speed limit of a location of the second vehicle.

21. The method of claim 13, wherein the first indicator comprises acceleration data based on the first vehicle recording an acceleration of the second vehicle, the method further comprising analyzing, by at least one of the vehicle guidance system and the first vehicle, changes in the acceleration to enable the vehicle guidance system to determine that the first indicator is indicative of the impaired driving.

22. The method of claim 13, wherein the first indicator comprises a first lane control data based on the first vehicle recording a first path of the second vehicle as the second vehicle travels in a first lane of a first location, the method further comprising analyzing, by at least one of the vehicle guidance system and the first vehicle, a first deviation of the first path relative to the first lane, wherein the second indicator comprises a second lane control data based on the third vehicle recording a second path of the second vehicle as the second vehicle travels in a second lane of a second location, the method further comprising analyzing, by at least one of the vehicle guidance system and the third vehicle, a second deviation of the second path relative to the second lane.

23. The method of claim 22, further comprising sending, from the vehicle guidance system to the fourth vehicle, the first communication in response to considering a combined evidence of both the first deviation and the second deviation.

24. A method of using a vehicle guidance system, the method comprising:

receiving from a first vehicle, by the vehicle guidance system, a first indicator of a second vehicle driving impaired, wherein the first vehicle comprises a first lane position detection system configured to generate three dimensional data representing an area outside the first vehicle, and the first lane position detection system comprises at least one of a first radar and a first lidar;

receiving, by the vehicle guidance system, a second indicator of a location of the second vehicle;

determining, by the vehicle guidance system based on the second indicator, that a third vehicle is within a predetermined distance of the second vehicle; and in response to receiving the first indicator and in response to the determining, sending, from the vehicle guidance system to the third vehicle, a communication configured to prompt the third vehicle to alter a driving route of the third vehicle to keep away from the second vehicle.

25. The method of claim 24, further comprising receiving, by the vehicle guidance system, the second indicator from the first vehicle.

26. The method of claim 24, further comprising determining that the second vehicle is driving impaired in response to:

tracking, by the first vehicle, a first path of the second vehicle as the first vehicle and the second vehicle travel on a first road, and analyzing, by at least one of the vehicle guidance system and the first vehicle, the first path.

27. A vehicle guidance system configured to receive a first impaired driving indicator, the vehicle guidance system comprising:

a first vehicle comprising a first lane position detection system configured to generate three dimensional data representing an area outside the first vehicle and having at least one of a first radar and a first lidar, wherein the first lane position detection system is configured to track a first path of a second vehicle as the first vehicle and the second vehicle travel on a first road, and the first lane position detection system is configured to determine a speed of the second vehicle and to measure movements of the second vehicle toward at least one of a left side of a first lane and a right side of the first lane;

a processor system configured to analyze a first deviation of the first path of the second vehicle relative to the first lane of the first road, wherein the processor system is configured to analyze the movements compared to the speed to determine that the first path relative to the first lane fluctuates more than a speed-relative threshold; and a communication system configured to automatically send a first communication to a third vehicle in response to the first path fluctuating more than the speed-relative threshold.

28. The vehicle guidance system of claim 27, further comprising a location tracking system configured to receive a first location indicator of the second vehicle and configured to receive a second location indicator of the third vehicle, wherein the communication system is configured to send the first communication to the third vehicle in response to the first path fluctuating more than the speed-relative threshold and in response to the location tracking system determining, based on the first location indicator and the second location indicator, that the third vehicle is within a first predetermined distance of the second vehicle.

29. The vehicle guidance system of claim 27, wherein the first communication is configured to warn the third vehicle regarding the second vehicle.

30. The vehicle guidance system of claim 27, wherein the first communication is configured to prompt the third vehicle to keep away from the second vehicle.

* * * * *